United States Patent
Liu et al.

(10) Patent No.: US 12,052,420 B2
(45) Date of Patent: Jul. 30, 2024

(54) INTRA PREDICTION AND RESIDUAL CODING

(71) Applicants: Beijing Bytedance Network Technology Co., Ltd., Beijing (CN); Bytedance Inc., Los Angeles, CA (US)

(72) Inventors: Hongbin Liu, Beijing (CN); Jizheng Xu, San Diego, CA (US); Li Zhang, San Diego, CA (US); Kai Zhang, San Diego, CA (US); Yue Wang, Beijing (CN)

(73) Assignees: BEIJING BYTEDANCE NETWORK TECHNOLOGY CO., LTD, Beijing (CN); BYTEDANCE INC., Los Angeles, CA (US)

(*) Notice: Subject to any disclaimer, the term of this patent is extended or adjusted under 35 U.S.C. 154(b) by 330 days.

(21) Appl. No.: 17/509,572

(22) Filed: Oct. 25, 2021

(65) Prior Publication Data
US 2022/0060710 A1 Feb. 24, 2022

Related U.S. Application Data

(63) Continuation of application No. PCT/CN2020/086456, filed on Apr. 23, 2020.

(30) Foreign Application Priority Data

Apr. 23, 2019 (WO) ................ PCT/CN2019/083850

(51) Int. Cl.
*H04N 19/132* (2014.01)
*H04N 19/124* (2014.01)
(Continued)

(52) U.S. Cl.
CPC ......... *H04N 19/132* (2014.11); *H04N 19/124* (2014.11); *H04N 19/159* (2014.11); *H04N 19/176* (2014.11); *H04N 19/18* (2014.11)

(58) Field of Classification Search
CPC .. H04N 19/132; H04N 19/124; H04N 19/159; H04N 19/176; H04N 19/18; H04N 19/61
See application file for complete search history.

(56) References Cited

U.S. PATENT DOCUMENTS

| | | | |
|---|---|---|---|
| 9,031,129 B2 | 5/2015 | Xu et al. | |
| 9,571,809 B2 | 2/2017 | Deng et al. | |

(Continued)

FOREIGN PATENT DOCUMENTS

| | | |
|---|---|---|
| CN | 105556963 A | 5/2016 |
| CN | 107623854 A | 1/2018 |

OTHER PUBLICATIONS

Abdoli et al. "CE8: BDPCM with Horizontal/Vertical Predictor and Independently Decodable Areas (Test 8.3.1b)," Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0057, 2019.

(Continued)

*Primary Examiner* — Dramos Kalapodas
(74) *Attorney, Agent, or Firm* — Perkins Coie LLP

(57) ABSTRACT

A method of video processing includes performing a prediction for a current video block or for a subblock split from the current video block; generating residual samples corresponding to the current video block or the subblock; obtaining quantized residual samples; and coding the quantized residual samples to perform a conversion on the current video block, a first one-dimensional (1-d) transform being applied to the residual samples before residual samples are quantized and/or a second 1-d transform being applied to the quantized residual samples.

20 Claims, 23 Drawing Sheets

(51) Int. Cl.
  *H04N 19/159* (2014.01)
  *H04N 19/176* (2014.01)
  *H04N 19/18* (2014.01)

(56) References Cited

U.S. PATENT DOCUMENTS

| | | | |
|---|---|---|---|
| 9,674,533 | B2 | 6/2017 | Wang |
| 10,142,627 | B2 | 11/2018 | Zhao et al. |
| 10,306,240 | B2 | 5/2019 | Xiu et al. |
| 10,321,140 | B2 | 6/2019 | Zhang et al. |
| 10,404,999 | B2 | 9/2019 | Liu et al. |
| 10,582,213 | B2 | 3/2020 | Li et al. |
| 10,750,172 | B2 | 8/2020 | Vanam et al. |
| 10,764,587 | B2 | 9/2020 | Zhang et al. |
| 10,812,806 | B2 | 10/2020 | Zhang et al. |
| 10,820,015 | B2 | 10/2020 | Zhang et al. |
| 10,841,593 | B2 | 11/2020 | Zhao et al. |
| 10,965,941 | B2 | 3/2021 | Zhao et al. |
| 2006/0238386 | A1 | 10/2006 | Huang et al. |
| 2009/0003443 | A1 | 1/2009 | Guo et al. |
| 2011/0286525 | A1 | 11/2011 | Kamisli et al. |
| 2015/0016542 | A1 | 1/2015 | Rosewarne et al. |
| 2015/0078441 | A1* | 3/2015 | Han ............... H04N 19/12 375/240.18 |
| 2016/0373742 | A1 | 12/2016 | Zhao et al. |
| 2016/0373743 | A1 | 12/2016 | Zhao et al. |
| 2016/0373770 | A1 | 12/2016 | Zhao et al. |
| 2016/0373782 | A1 | 12/2016 | Zhao et al. |
| 2017/0142413 | A1* | 5/2017 | Tanaka ............... H04N 19/30 |
| 2017/0230671 | A1* | 8/2017 | Kim ............... H04N 19/59 |
| 2017/0332098 | A1 | 11/2017 | Rusanovskyy et al. |
| 2017/0353726 | A1* | 12/2017 | Tanaka ............... H04N 19/59 |
| 2018/0199061 | A1 | 7/2018 | Zhang et al. |
| 2019/0045184 | A1 | 2/2019 | Zhang et al. |
| 2019/0104303 | A1 | 4/2019 | Xiu et al. |
| 2019/0166370 | A1 | 5/2019 | Xiu et al. |
| 2019/0174145 | A1 | 6/2019 | Zhang et al. |
| 2019/0238864 | A1 | 8/2019 | Xiu et al. |
| 2019/0373285 | A1 | 12/2019 | Vanam et al. |
| 2020/0059647 | A1* | 2/2020 | Andersson ............... H04N 19/18 |
| 2020/0177910 | A1 | 6/2020 | Li et al. |
| 2020/0314418 | A1 | 10/2020 | Wang et al. |
| 2020/0314432 | A1 | 10/2020 | Wang et al. |
| 2020/0413045 | A1 | 12/2020 | Zhang et al. |
| 2021/0029352 | A1 | 1/2021 | Zhang et al. |
| 2021/0092395 | A1 | 3/2021 | Zhang et al. |
| 2021/0136395 | A1* | 5/2021 | Jun ............... H04N 19/70 |
| 2022/0086443 | A1* | 3/2022 | Lim ............... H04N 19/159 |

OTHER PUBLICATIONS

Bross et al. "Versatile Video Coding (Draft 5)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N1001, 2019.

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

Clare et al. "CE8: BDPCM with Harmonized Residual Coding and CCB Limitation (CE8-3.1a, CE8-3.1b, CE8-5.1a, CE8-5.1b)," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0214, 2019.

De-Luxán-Hernández et al. "CE3: Intra Sub-Partitions Coding Mode (Tests 1.1.1 and 1.1.2)." Joint Video Experts Team (JVET) of ITU-T SG 16 WP 3 and ISO/IEC JTC 1/SC 29/WG 11 13th Meeting: Marrakech, MA, Jan. 9-18, 2019, document JVET-M0102, 2019.

"High Efficiency Video Coding," Series H: Audiovisual and Multimedia Systems: Infrastructure of Audiovisual Services—Coding of Moving Video, ITU-T Telecommunication Standardization Sector of ITU, H.265, Feb. 2018.

Karczewicz et al. "Geometry Transformation-based Adaptive In-Loop Filter," 2016 IEEE, Qualcomm Technologies Inc. San Diego, CA, USA.

Karczewicz et al. "CE8-Related: Quantized Residual BDPCM," Joint Video Experts Team (JVET) of ITU-T SG 16 WP 3 and ISO/IEC JTC 1/SC 29/WG 11 14th Meeting: Geneva, CH, Mar. 19-27, 2019, document JVET-N0413, 2019.

Vcgit.hhi.fraunhofer.de/jvet/VVCSoftware_VTM/tags/VTM-4.1.

International Search Report and Written Opinion from PCT/CN2020/086456 dated Aug. 11, 2020 (12 pages).

* cited by examiner

INTRA PREDICTION AND RESIDUAL CODING

CROSS-REFERENCE TO RELATED APPLICATIONS

This application is a continuation of International Application No. PCT/CN2020/086456, filed on Apr. 23, 2020, which claims the priority to and benefit of International Patent Application PCT/CN2019/083850, filed on Apr. 23, 2019. The entire disclosures thereof are incorporated by reference as part of the disclosure of this application.

TECHNICAL FIELD

This patent document relates to video coding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

The present document describes various embodiments and techniques for performing intra prediction based decoding or encoding video or images in which residual coding is performed using a transform and/or prediction of the residual.

In one example aspect, a method for video processing is disclosed. The method comprises: performing a prediction for a current video block or for a subblock split from the current video block; generating residual samples corresponding to the current video block or the subblock; obtaining quantized residual samples; and coding the quantized residual samples to perform a conversion on the current video block; wherein a first one-dimensional (1-d) transform is applied to the residual samples before residual samples are quantized and/or a second 1-d transform is applied to the quantized residual samples.

In another example aspect, a method for video processing is disclosed. The method comprises: enabling to apply a BDPCM scheme to a current video block coded with a specific intra-prediction in response to a first condition; enabling to apply a quantized residual domain BDPCM (RBDPCM) scheme in response to a second condition to predict quantized residual samples corresponding to the current video block, and performing a conversion between the current video block and a bitstream representation of the current video block.

In another example aspect, a method for video processing is disclosed. The method comprises: predicting a current video block in an intra prediction mode; generating residual samples corresponding to the current video block; performing a quantization on the residual samples, wherein different quantization parameters(QPs) are applied to different residual samples; and performing a conversion between the current video block and a bitstream representation of the current video block.

In yet another example aspect, a method for video processing is disclosed. The method comprises: predicting a current video block in a specific prediction mode; generating residual samples corresponding to the current video block; modifying the residual samples at a specific location before performing at least one of a quantization and a transform on the residual samples; and performing a conversion between the current video block and a bitstream representation of the current video block.

In still another example aspect, a method for video processing is disclosed. The method comprises: performing an intra prediction for a current video block; generating residual samples corresponding to the current video block; and coding the residual samples in a transform skip mode, wherein the residual samples are quantized with a dependent quantization or a trellis coded quantization.

In another example aspect, a method for video processing is disclosed. The method comprises: performing an intra prediction for a current video block; generating residual samples corresponding to the current video block; and coding the residual samples in a transform skip mode, wherein the residual samples are rotated in a direction by a specific degree so that the residual samples can be scanned in a same order as in a transform mode.

In another example aspect, a method for video processing is disclosed. The method comprises: performing an intra prediction for a current video block; generating residual samples corresponding to the current video block; and coding the residual samples in a transform mode, wherein transform cores used in the transform mode are flipped in response to an indication so that transform coefficients can be scanned in a same order as in a transform skip mode.

In yet another example aspect, a video processing apparatus is disclosed. The video processing apparatus is configured to implement one or more of the methods described herein.

In yet another example aspect, a computer-readable program medium is disclosed. A code for implemented one or more of the above described methods is stored on the computer-readable program medium.

These, and other, aspects are described in the present document.

DETAILED DESCRIPTION

Figure 1:
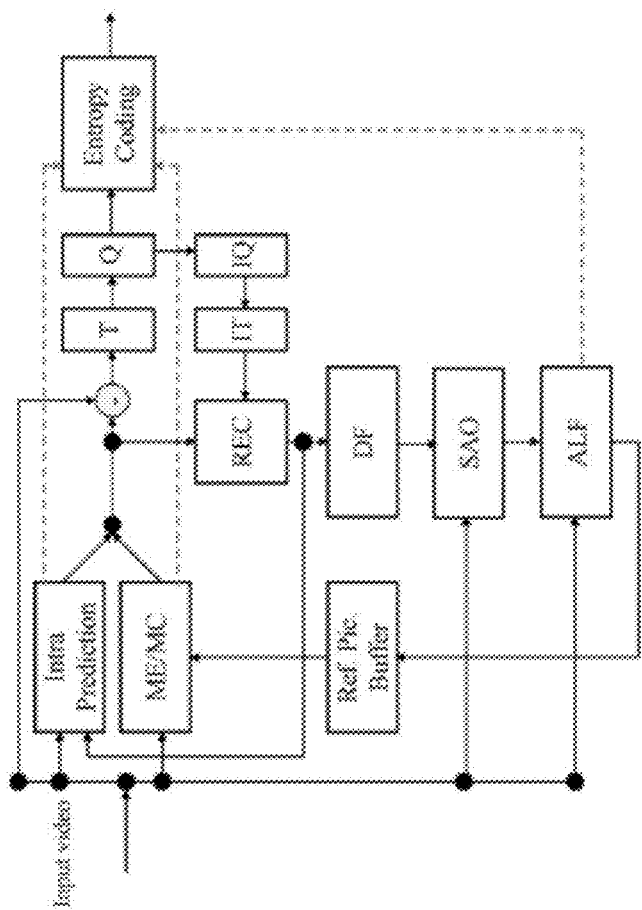
FIG. 1 shows an example of an encoder block diagram.

Section headings are used in the present document to facilitate ease of understanding and do not limit the embodiments disclosed in a section to only that section. Furthermore, while certain embodiments are described with reference to Versatile Video Coding or other specific video codecs, the disclosed techniques are applicable to other video coding technologies also. Furthermore, while some embodiments describe video coding steps in detail, it will be understood that corresponding steps decoding that undo the coding will be implemented by a decoder. The term "video processing" used in the present document encompasses video coding or compression, video decoding or decompression or construction, and video transcoding in which video bitrate or coding format is changed.

1. Summary

This patent document is related to video coding technologies. Specifically, it is related to intra prediction and residual coding in video coding. It may be applied to the existing video coding standard like HEVC, or the standard (Versatile Video Coding) to be finalized. It may be also applicable to future video coding standards or video codec.

2. Background

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

2.1 Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

2.1.1 Format 4:4:4

Each of the three Y'CbCr components have the same sample rate, thus there is no chroma subsampling. This scheme is sometimes used in high-end film scanners and cinematic post production.

2.1.2 Format 4:2:2

The two chroma components are sampled at half the sample rate of luma: the horizontal chroma resolution is halved. This reduces the bandwidth of an uncompressed video signal by one-third with little to no visual difference 2.1.3 Format 4:2:0

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially), In JPEG/JFIF, −0.261, and MPEG-1, Cb and Cr are sited interstitially, halfway between alternate luma samples.

In 4:2:0 DV. Cb and Cr are co-sited in the horizontal direction. In the vertical direction, they are co-sited on alternating lines.

2.2. Coding Flow of a Typical Video Codec

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

2.3 Intra Mode Coding with 67 Intra Prediction Modes

To capture the arbitrary edge directions presented in natural video, the number of directional intra modes is extended from 33, as used in HEVC, to 65. The additional directional modes are depicted as red dotted arrows in FIG. 2, and the planar and DC modes remain the same. These denser directional intra prediction modes apply for all block sizes and for both luma and chroma intra predictions.

Figure 2:
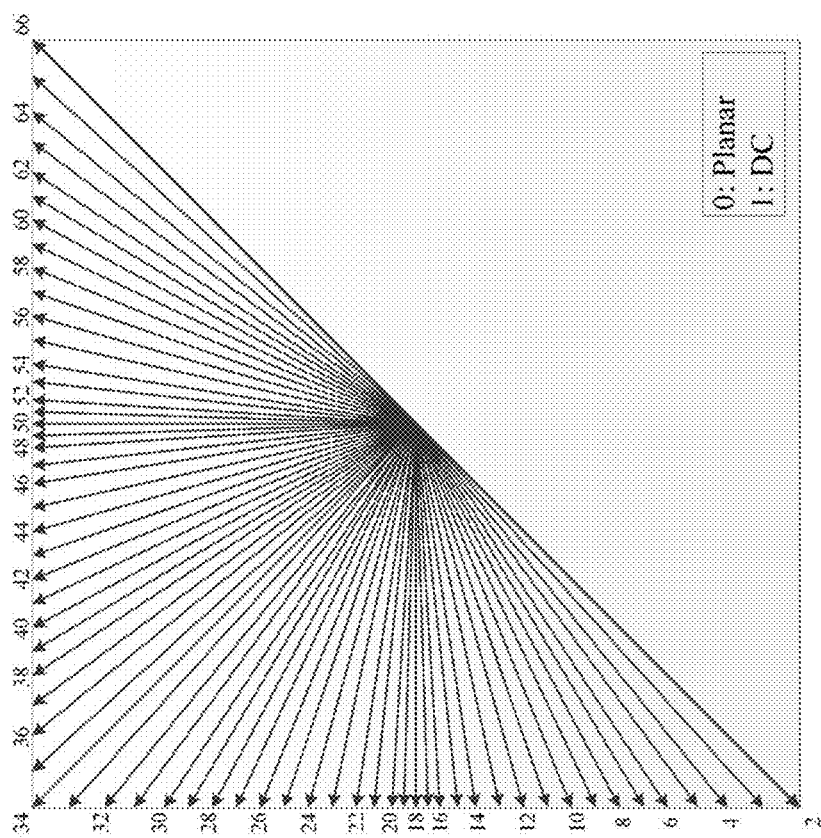
FIG. 2 shows an example of 67 intra prediction modes.

Conventional angular intra prediction directions are defined from 45 degrees to −135 degrees in clockwise direction as shown in FIG. 2. In VTM2, several conventional angular intra prediction modes are adaptively replaced with wide-angle intra prediction modes for the non-square blocks. The replaced modes are signaled using the original method and remapped to the indexes of wide angular modes after parsing. The total number of intra prediction modes is unchanged, i.e., 67, and the intra mode coding is unchanged.

In the HEVC, every intra-coded block has a square shape and the length of each of its side is a power of 2. Thus, no division operations are required to generate an intra-predictor using DC mode. In VVV2, blocks can have a rectangular shape that necessitates the use of a division operation per block in the general case. To avoid division operations for DC prediction, only the longer side is used to compute the average for non-square blocks.

2.4 Wide-Angle Intra Prediction for Non-Square Blocks

Conventional angular intra prediction directions are defined from 45 degrees to −135 degrees in clockwise direction. In VTM2, several conventional angular intra prediction modes are adaptively replaced with wide-angle intra prediction modes for non-square blocks. The replaced modes are signaled using the original method and remapped to the indexes of wide angular modes after parsing. The total number of intra prediction modes for a certain block is unchanged, i.e., 67, and the intra mode coding is unchanged.

Figure 3A:
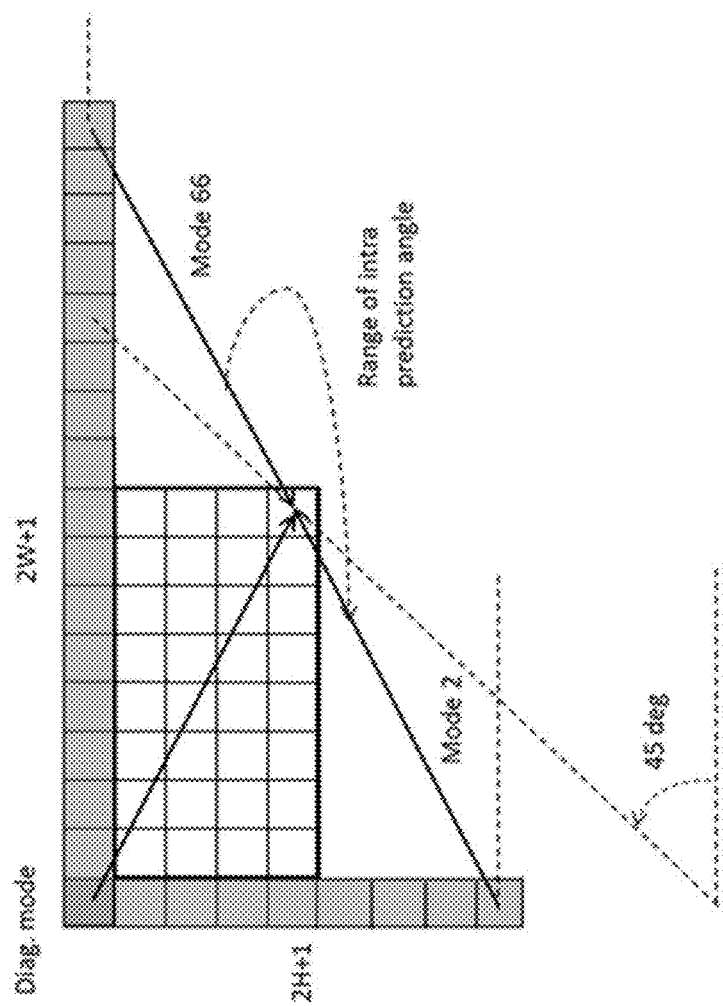
FIG. 3A-3B show examples of reference samples for wide-angular intra prediction.
Figure 3B:
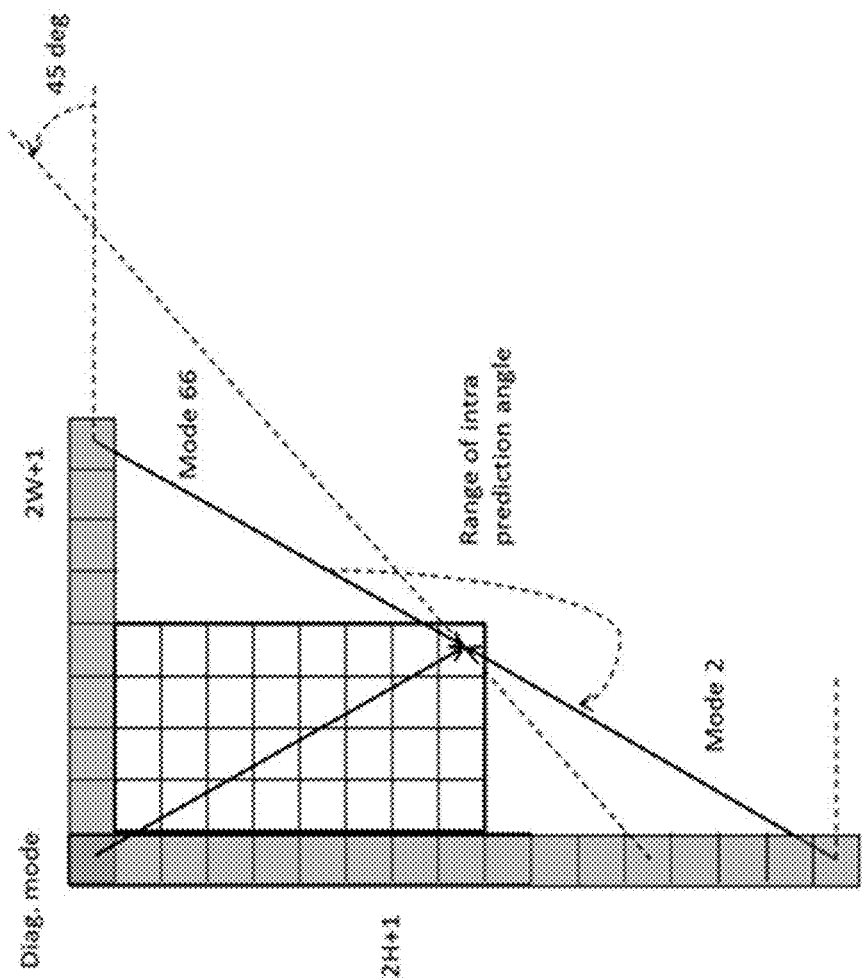

To support these prediction directions, the top reference with length 2W+1, and the left reference with length 2H+1, are defined as shown in FIG. 3A-3B.

The mode number of replaced mode in wide-angular direction mode is dependent on the aspect ratio of a block. The replaced intra prediction modes are illustrated in Table 2-1.

TABLE 2-1

Intra prediction modes replaced by wide-angular modes

| Condition | Replaced intra prediction modes |
|---|---|
| W / H == 2 | Modes 2, 3, 4, 5, 6, 7 |
| W/H > 2 | Modes 2, 3, 4, 5, 6, 7, 8, 9, 10, 11 |
| W/H == 1 | None |
| W/ H == ½ | Modes 61, 62, 63, 64, 65, 66 |
| W / H < ½ | Mode 57, 58, 59, 60, 61, 62, 63, 64, 65, 66 |

Figure 4:
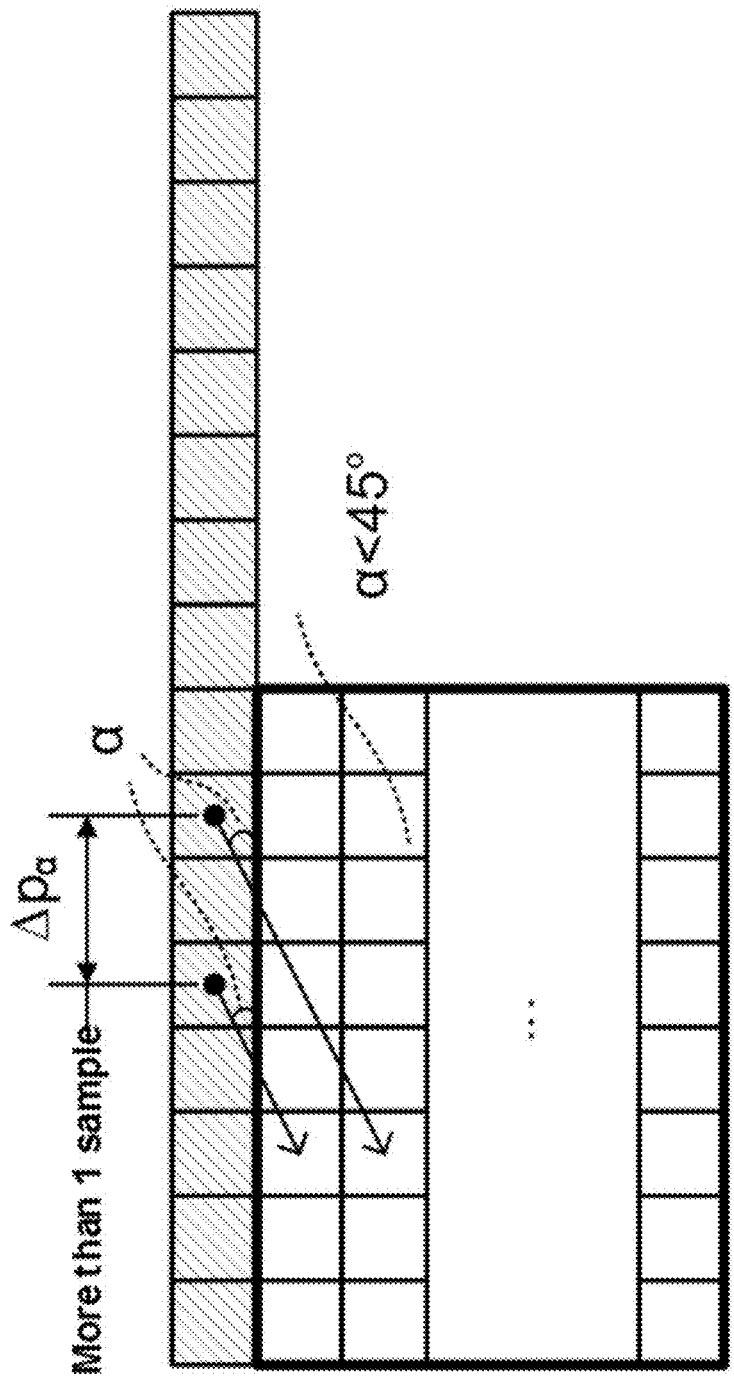
FIG. 4 is an example illustration of a problem of discontinuity in case of directions beyond 45 degrees.

FIG. 4 is an example illustration of a problem of discontinuity in case of directions beyond 45 degrees. As shown in FIG. 4, two vertically-adjacent predicted samples may use two non-adjacent reference samples in the case of wide-angle intra prediction. Hence, low-pass reference samples filter and side smoothing are applied to the wide-angle prediction to reduce the negative effect of the increased gap $\Delta_{p\alpha}$.

2.5 Position Dependent Intra Prediction Combination

In the VTM2, the results of intra prediction of planar mode are further modified by a position dependent intra prediction combination (PDPC) method. PDPC is an intra prediction method which invokes a combination of the un-filtered boundary reference samples and HEVC style intra prediction with filtered boundary reference samples. PDPC is applied to the following intra modes without signaling: planar, DC, horizontal, vertical, bottom-left angular mode and its eight adjacent angular modes, and top-right angular mode and its eight adjacent angular modes.

The prediction sample pred(x,y) is predicted using an intra prediction mode (DC, planar, angular) and a linear combination of reference samples according to the Equation as follows:

$$\text{pred}(x,y)=(wL\times R_{-1,y}+wT\times R_{x,-1}-wTL\times R_{-1,-1}+(64-wL-wT+wTL)\times\text{pred}(x,y)+32)\gg 6$$

where $R_{x,-1}$, $R_{-1,y}$ represent the reference samples located at the top and left of current sample (x, y), respectively, and $R_{-1,-1}$ represents the reference sample located at the top-left corner of the current block.

If PDPC is applied to DC, planar, horizontal, and vertical intra modes, additional boundary filters are not needed, as required in the case of HEVC DC mode boundary filter or horizontal/vertical mode edge filters.

FIG. 5A-5D illustrates the definition of reference samples ($R_{x,-1}$, $R_{-1,y}$, and $R_{-1,-1}$) for PDPC applied over various prediction modes. The prediction sample pred (x', y') is located at (x', y') within the prediction block. The coordinate x of the reference sample $R_{x,-1}$ is given by: x=x'+y'+1, and the coordinate y of the reference sample $R_{-1,y}$ is similarly given by: y=x'+y'+1.

Figure 5A:
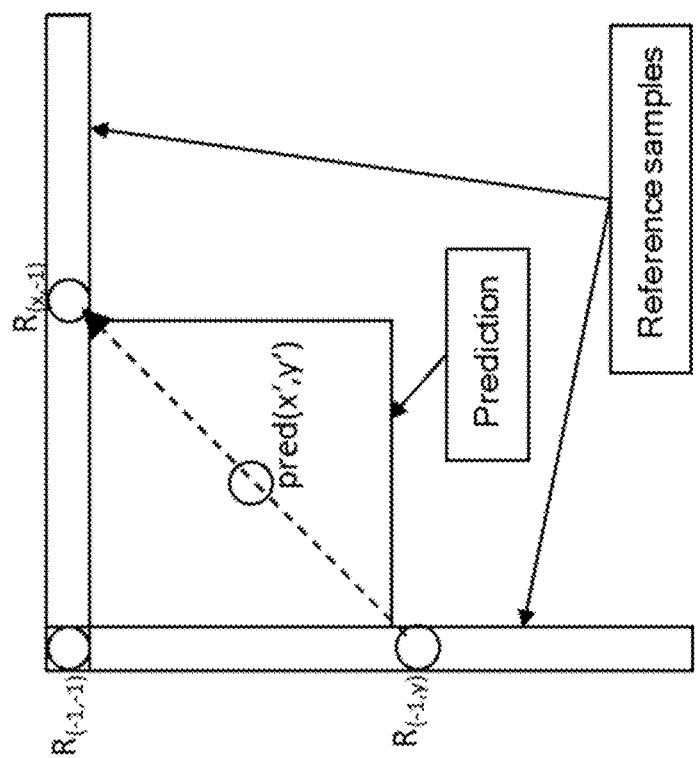
FIG. 5A-5D show an example illustration of samples used by PDPC applied to diagonal and adjacent angular intra modes.
Figure 5B:
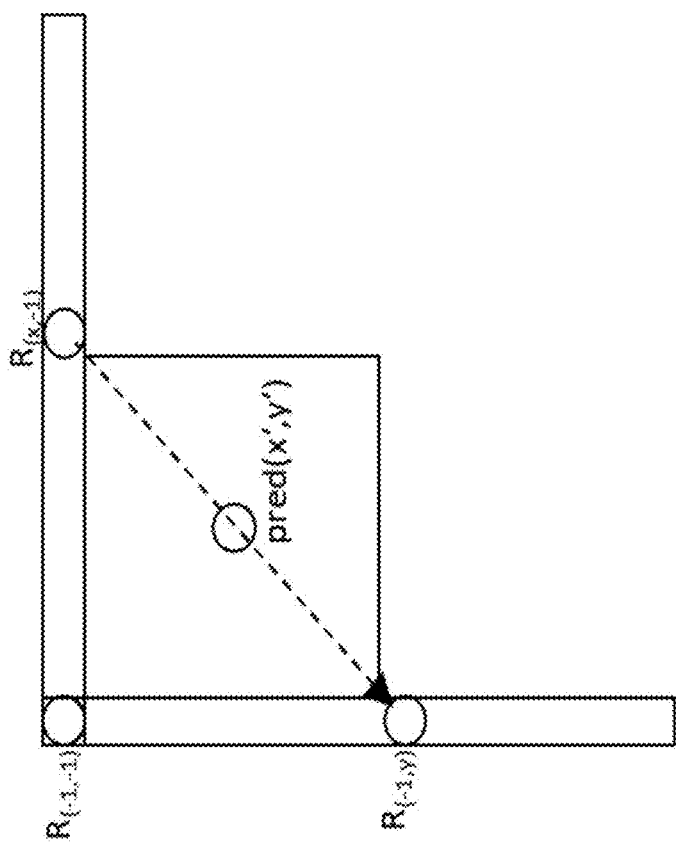
Figure 5C:
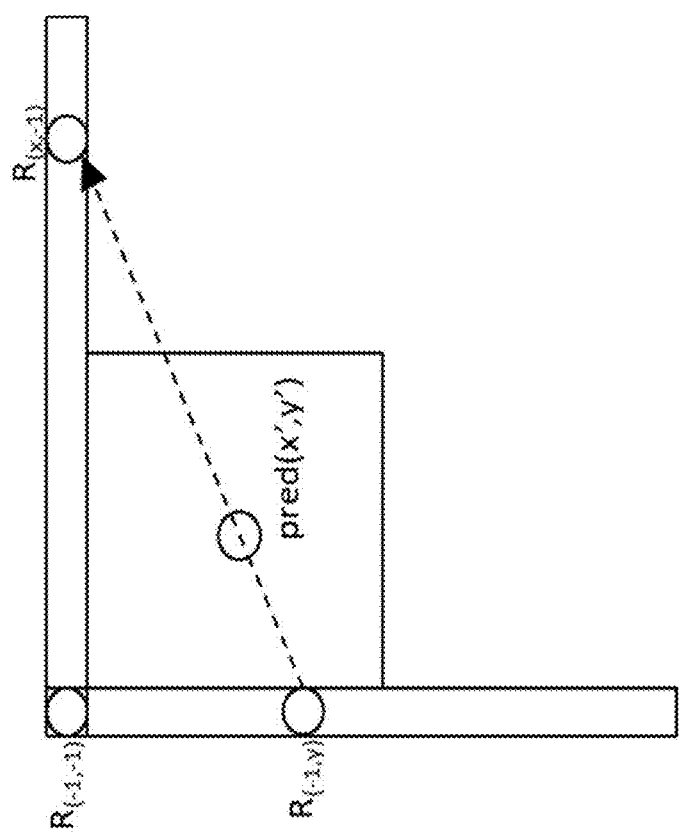
Figure 5D:
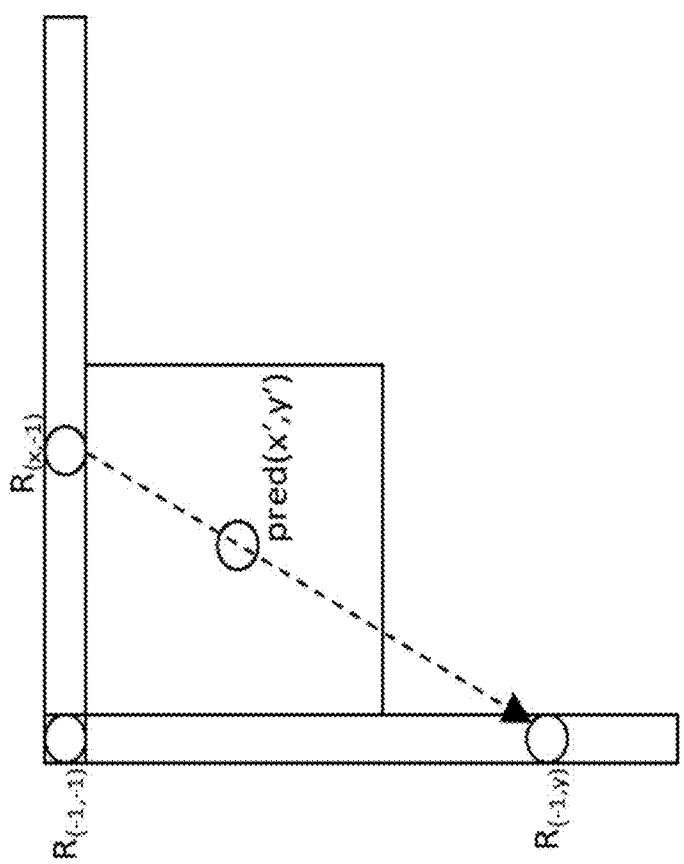

FIG. 5A-5D show an example illustration of samples used by PDPC applied to diagonal and adjacent angular intra modes. FIG. 5A shows Diagonal top-right mode. FIG. 5B shows Diagonal bottom-left mode. FIG. 5C shows Adjacent diagonal top-right mode. FIG. 5D shows adjacent diagonal bottom-left mode.

The PDPC weights are dependent on prediction modes and are shown in Table 2-2.

TABLE 2-2

Example of PDPC weights according to prediction modes

| Prediction modes | wT | wL | wTL |
|---|---|---|---|
| Diagonal top-right | 16 >> ((y' << 1) >> shift) | 16 >> ((x' << 1) >> shift) | 0 |
| Diagonal bottom-left | 16 >> ((y' << 1) >> shift) | 16 >> ((x' << 1) >> shift) | 0 |
| Adjacent diagonal top-right | 32 >> ((y' << 1) >> shift) | 0 | 0 |
| Adjacent diagonal bottom-left | 0 | 32 >> ((x' << 1) >> shift) | 0 |

2.6 Intra Subblock Partitioning (ISP)

Figure 6:
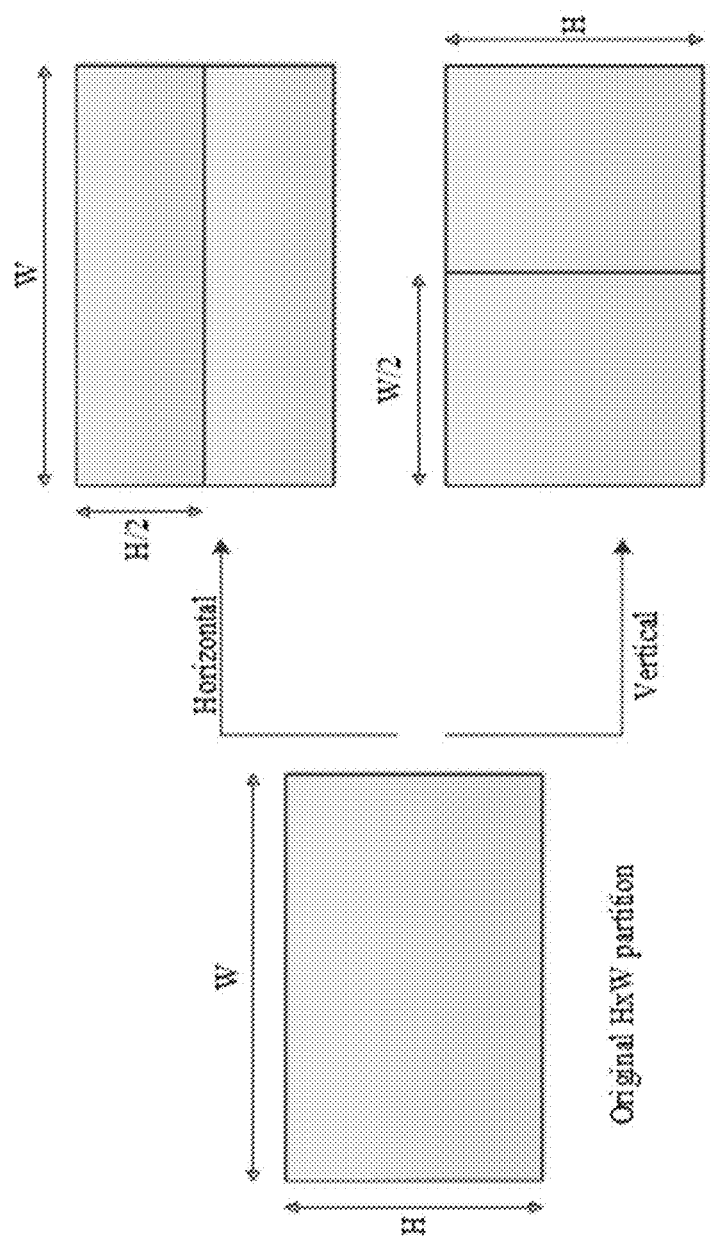
FIG. 6 is an example of division of 4×8 and 8×4 blocks.
Figure 7:
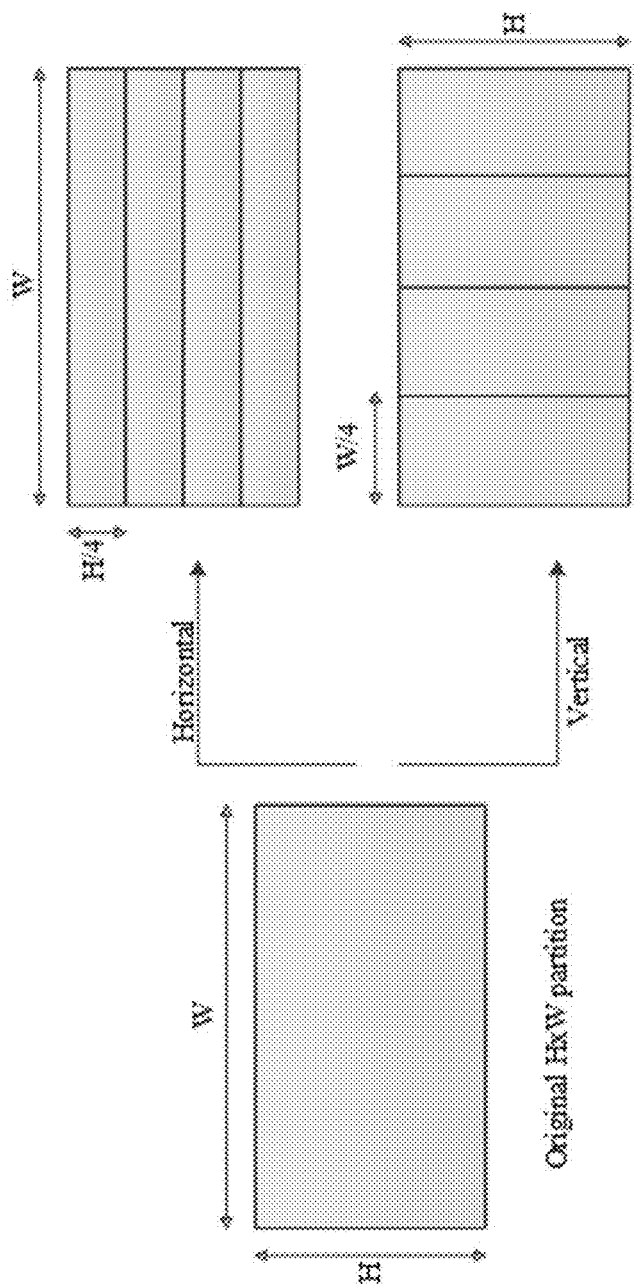
FIG. 7 is an example of division of all blocks except 4×8, 8×4 and 4×4.

In an example, ISP is proposed, which divides luma intra-predicted blocks vertically or horizontally into 2 or 4 sub-partitions depending on the block size dimensions, as shown in Table 3. FIG. 6 and FIG. 7 show examples of the two possibilities. All sub-partitions fulfill the condition of having at least 16 samples.

TABLE 3

Number of sub-partitions depending on the block size.

| Block Size | Number of Sub-Partitions |
|---|---|
| 4 × 4 | Not divided |
| 4 × 8 and 8 × 4 | 2 |
| All other cases | 4 |

FIG. 6 is an example of division of 4×8 and 8×4 blocks.

FIG. 7 is an example of division of all blocks except 4×8, 8×4 and 4×4.

For each of these sub-partitions, a residual signal is generated by entropy decoding the coefficients sent by the encoder and then inverse quantizing and inverse transforming them. Then, the sub-partition is intra predicted and finally the corresponding reconstructed samples are obtained by adding the residual signal to the prediction signal. Therefore, the reconstructed values of each sub-partition will be available to generate the prediction of the next one, which will repeat the process and so on. All sub-partitions share the same intra mode.

Based on the intra mode and the split utilized, two different classes of processing orders are used, which are referred to as normal and reversed order. In the normal order, the first sub-partition to be processed is the one containing the top-left sample of the CU and then continuing downwards (horizontal split) or rightwards (vertical split). As a result, reference samples used to generate the sub-partitions prediction signals are only located at the left and above sides of the lines. On the other hand, the reverse processing order either starts with the sub-partition containing the bottom-left sample of the CU and continues upwards or starts with sub-partition containing the top-right sample of the CU and continues leftwards.

2.7 Block Differential Pulse-Code Modulation Coding (BDPCM)

BDPCM is proposed in an example. Due to the shape of the horizontal (resp. vertical) predictors, which use the left (A) (resp. top (B)) pixel for prediction of the current pixel, the most throughput-efficient way of processing the block is to process all the pixels of one column (resp. line) in parallel, and to process these columns (resp. lines) sequentially. In order to increase throughput, we introduce the following process: a block of width 4 is divided into two halves with a horizontal frontier when the predictor chosen on this block is vertical, and a block of height 4 is divided into two halves with a vertical frontier when the predictor chosen on this block is horizontal.

When a block is divided, samples from one area are not allowed to use pixels from another area to compute the prediction: if this situation occurs, the prediction pixel is replaced by the reference pixel in the prediction direction. This is shown on FIG. 8 for different positions of current pixel X in a 4×8 block predicted vertically.

Figure 8:
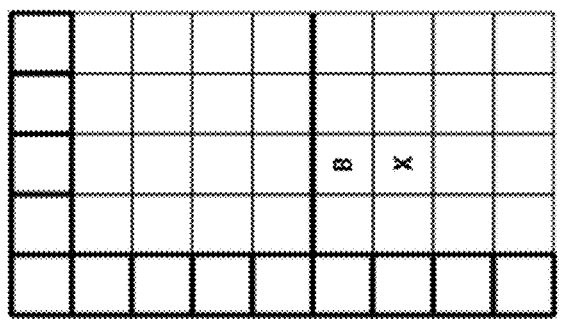
FIG. 8 dividing a block of 4×8 samples into two independently decodable areas.
Figure 8:
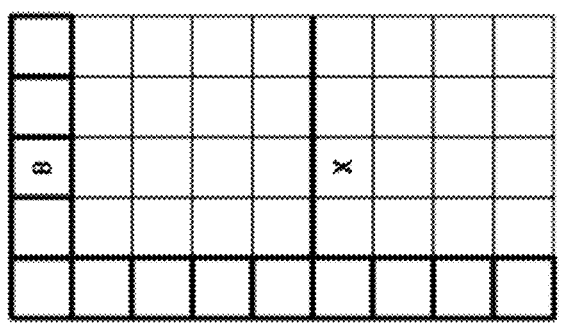
Figure 8:
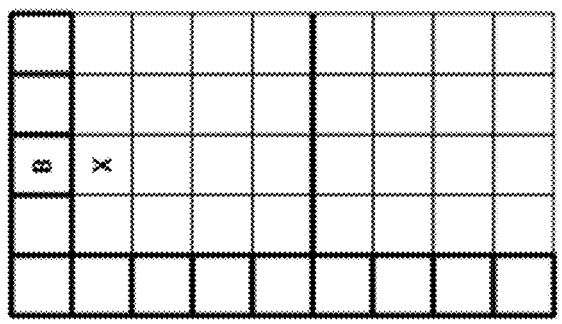

FIG. 8 dividing a block of 4×8 samples into two independently decodable areas.

Figure 9:
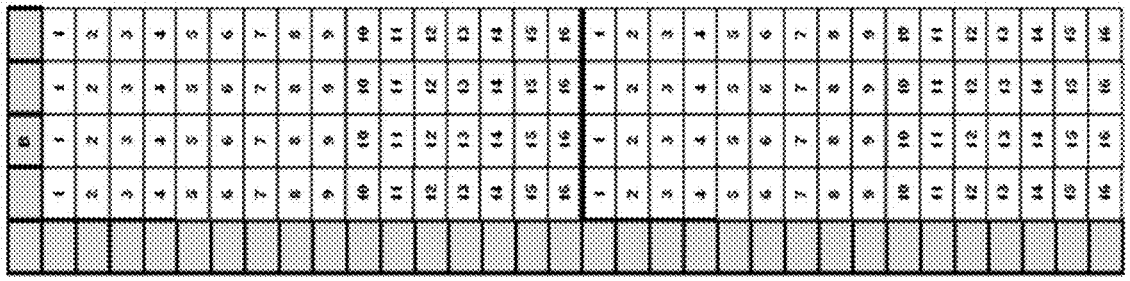
FIG. 9 shows an example order of processing of the rows of pixels to maximize throughput for 4×N blocks with vertical predictor FIG. 10 an example of proposed improvement on BDPCM/RBDPCM.
Figure 9:
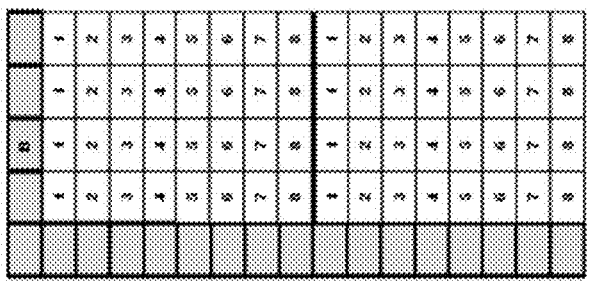
Figure 9:
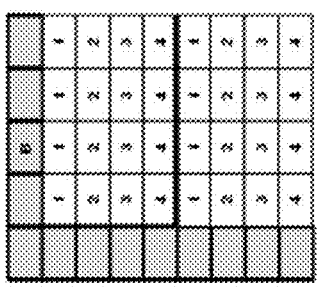
Figure 9:
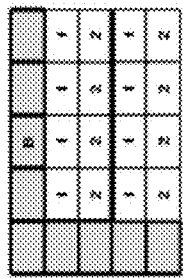

Thanks to this property, it becomes now possible to process a 4×4 block in 2 cycles, and a 4×8 or 8×4 block in 4 cycles, and so on, as shown on FIG. 9.

FIG. 9 shows an example order of processing of the rows of pixels to maximize throughput for 4×N blocks with vertical predictor.

Table 4 summarizes the number of cycles required to process the block, depending on the block size. It is trivial to show that any block which has both dimensions larger or equal to 8 can be processed in 8 pixels per cycle or more.

TABLE 4

| | Worst case throughput for blocks of size 4 × N, N × 4 | | | |
|---|---|---|---|---|
| Block size | 4 × 4 | 4 × 8, 8 × 4 | 4 × 16, 16 × 4 | 4 × 32, 32 × 4 |
| Cycles | 2 | 4 | 8 | 16 |
| Pixels | 16 | 32 | 64 | 128 |
| Throughput (pixels/cycle) | 8 | 8 | 8 | 8 |

2.8 Quantized Residual Domain BDPCM

In an example, quantized residual domain BDPCM (denote as RBDPCM hereinafter) is proposed. The intra prediction is done on the entire block by sample copying in prediction direction (horizontal or vertical prediction) similar to intra prediction. The residual is quantized and the delta between the quantized residual and its predictor (horizontal or vertical) quantized value is coded.

For a block of size M (rows)×N (cols), let $r_{i,j}$, $0 \leq i \leq M-1$, $0 \leq j \leq N-1$. be the prediction residual after performing intra prediction horizontally (copying left neighbor pixel value across the predicted block line by line) or vertically (copying top neighbor line to each line in the predicted block) using unfiltered samples from above or left block boundary samples. Let Q(rg,j), $0 \leq 1 \leq M-1$, $0 \ j \leq N-1$ denote the quantized version of the residual $r_{i,j}$, where residual is difference between original block and the predicted block values. Then the block DPCM is applied to the quantized residual samples, resulting in modified M×N array $\tilde{R}$ with elements $\tilde{r}_{i,j}$. When vertical BDPCM is signalled:

$$\tilde{r}_{i,j} = \begin{cases} Q(r_{i,j}), & i = 0, \quad 0 \leq j \leq (N-1) \\ Q(r_{i,j}) - Q(r_{(i-1),j}), & 1 \leq i \leq (M-1), \ 0 \leq j \leq (N-1) \end{cases}.$$

For horizontal prediction, similar rules apply, and the residual quantized samples are obtained by $$\tilde{r}_{i,j} = \begin{cases} Q(r_{i,j}), & 0 \leq i \leq (M-1), j = 0 \\ Q(r_{i,j}) - Q(r_{(i-1),j}), & 0 \leq i \leq (M-1), 1 \leq j \leq (N-1) \end{cases}.$$

The residual quantized samples $\tilde{r}_{i,j}$ are sent to the decoder.

On the decoder side, the above calculations are reversed to produce $Q(r_{i,j})$, $0 \leq i \leq M-1$, $0 \leq j \leq N-1$. For vertical prediction case, $$Q(r_{i,j}) = \sum_{k=0}^{i} \tilde{r}_{k,j}, 0 \leq i \leq (M-1), 0 \leq j \leq (N-1).$$

For horizontal case, $$Q(r_{i,j}) = \sum_{k=0}^{j} \tilde{r}_{i,k}, 0 \leq i \leq (M-1), 0 \leq j \leq (N-1).$$

The inverse quantized residuals, $Q^{-1}(Q(r_{i,j}))$, are added to the intra block prediction values to produce the reconstructed sample values.

The main benefit of this scheme is that the inverse DPCM can be done on the fly during coefficient parsing simply adding the predictor as the coefficients are parsed or it can be performed after parsing.

Transform skip is always used in quantized residual domain BDPCM.

3. Examples of Problems Solved by Disclosed Embodiments

The ISP and DPCM design has the following problems:
1. Blocks coded in ISP are split into several subblocks and these subblocks cannot be predicted in parallel.
2. In DPCM/BDPCM/RBDPCM, only few prediction directions are supported.
3. In BDPCM/RBDPCM, transform is always skipped and may be inefficient when there is still redundancy between prediction residual.

4. Examples of Embodiments and Techniques

The examples below should be considered as examples to explain general concepts. These inventions should not be interpreted in a narrow way. Furthermore, these techniques can be combined in any manner.

In the following description, coding information may include prediction mode (e.g., intra/inter/IBC mode), motion vector, reference picture, inter prediction direction, intra prediction mode, CIIP (combined intra inter prediction) mode, ISP mode, affine intra mode, employed transform core, transform skip flag etc., i.e., information required when encoding a block. Residual (or prediction error) refers to the difference between the original sample and the predicted sample. Residual at a first position (or multiple positions) may be used to predict residual at a second position, which is called residual prediction. Residual prediction error refers to the difference between the original residual and the predicted residual. Transform mode represents the case that transform is applied for coding one block.

Figure 10:
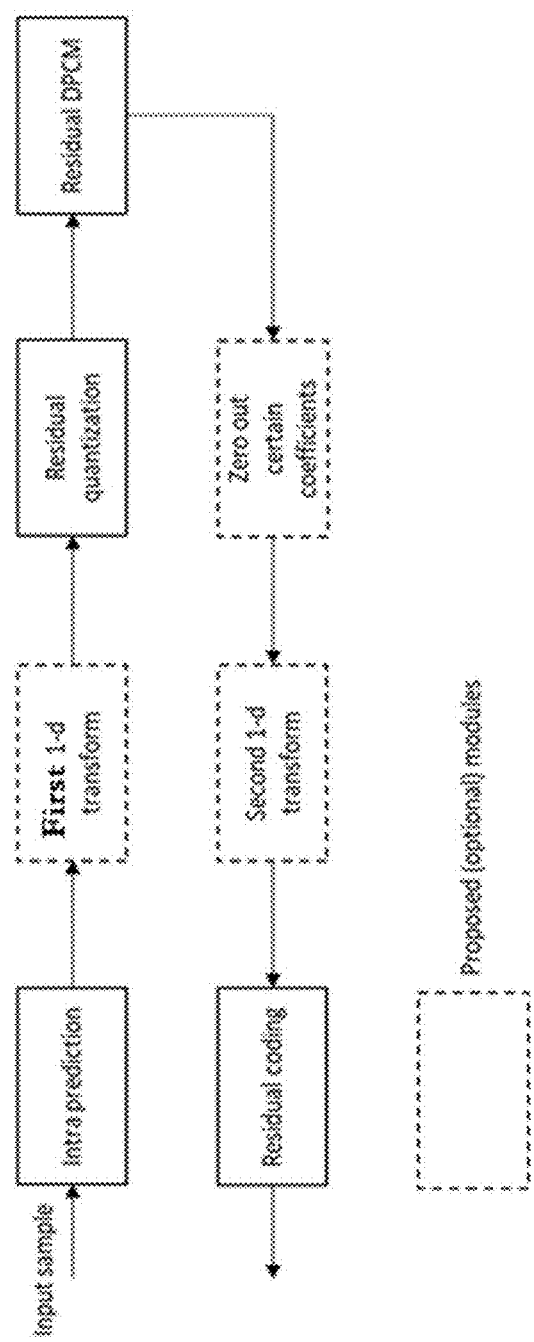

1. Transform may be applied for BDPCM or/and RBDPCM coded blocks. An example is illustrated in FIG. 10.
   a. In one example, a first 1-d transform may be performed before residual quantization.
      i. For example, if residual of a block/sub-block in BDPCM mode is coded row by row, the first 1-d transform may be applied to each row.
      ii. For example, if residual of a block/sub-block in BDPCM mode is coded column by column, the first 1-d transform may be applied to each column.
      iii. For example, if residual of a block/sub-block in RBDPCM mode is predicted in the vertical direction, the first 1-d transform may be applied to each row.
      iv. For example, if residual of a block/sub-block in RBDPCM mode is predicted in the horizontal direction, the first 1-d transform may be applied to each column.
      v. Alternatively, furthermore, the first 1-d transform may be only applied to some selected rows or columns.
      vi. Alternatively, furthermore, before the first 1-d transform, certain rows/columns of residual may be forced to be zero.
      vii. Alternatively, furthermore, after the first 1-d transform, certain coefficients may be forced to be zero.
   b. In one example, a second 1-d transform may be performed after residual prediction in RBDPCM.
      i. In one example, if residual of a block/sub-block in RBDPCM mode is predicted vertically, the second 1-d transform may be applied to each column.
      ii. For example, if residual of a block/sub-block in RBDPCM mode is predicted horizontally, the second 1-d transform may be applied to each row.
      iii. For the second 1-d transform may be only applied to some selected rows or columns.
   c. In one example, the second 1-d transform may be performed for one or multiple groups of rows or columns (e.g., K rows or columns, K>1). Transform coefficients or quantized transform coefficients of a first group may be used to predict transform coefficients of a second group.
      i. In one example, Hadamard transform may be used as the second 1-d transform. Average value of a first group may be used to predict average value of a second group.
      ii. In one example, quantization may be performed after the second 1-d transform.
         1) Alternatively, furthermore, when certain coefficients are predicted from previous coefficients, the differences between the to-be-coded coefficients and the previous coefficients is calculated and quantized.
      iii. In one example, a first quantization may be performed before the second 1-d transform, and a second quantization may be performed after the second 1-d transform.
         1) Alternatively, furthermore, in the second quantization, when certain coefficients are predicted from previous coefficients, the differences between the to-be-coded coefficients and the previous coefficients is calculated and quantized.
         2) Furthermore, the second quantization may be applied to transform coefficients that are not used for predicting other transform coefficients.
   d. In one example, 1-d transform may be performed either before residual quantization or after residual prediction, but not both.
      i. In one example, the first transform and the second transform cannot be applied both.
   e. In one example, the 1-d transform (e.g, the first/second 1-d transform) may be defined to be one of allowed transforms in the MTS mode, such as DCT-II, DST-VII, DCT-VIII.
   f. In one example, the 1-d transform (e.g, the first/second 1-d transform) may be defined to be one of allowed secondary transform in the RTS mode, such as non-separable transform.
   g. In one example, the 1-d transform may be applied to the whole block.
      i. Alternatively, it may be applied to partial of the block.
   h. Which transform core is used may be signaled explicitly such as in VPS/SPS/PPS/slice header/tile group header/tile/CTU/CU etc.
      i. Alternatively, which transform core is used may be derived implicitly.
      ii. For example, a fixed transform core (e.g., DCT-II) is used.
      iii. For example, the transform core may depend on the slice type/picture type/CU type/QP of the block/coding information/dimension information of the block etc.
      iv. For example, the transform core may depend on the intra-prediction mode.

Figure 11:
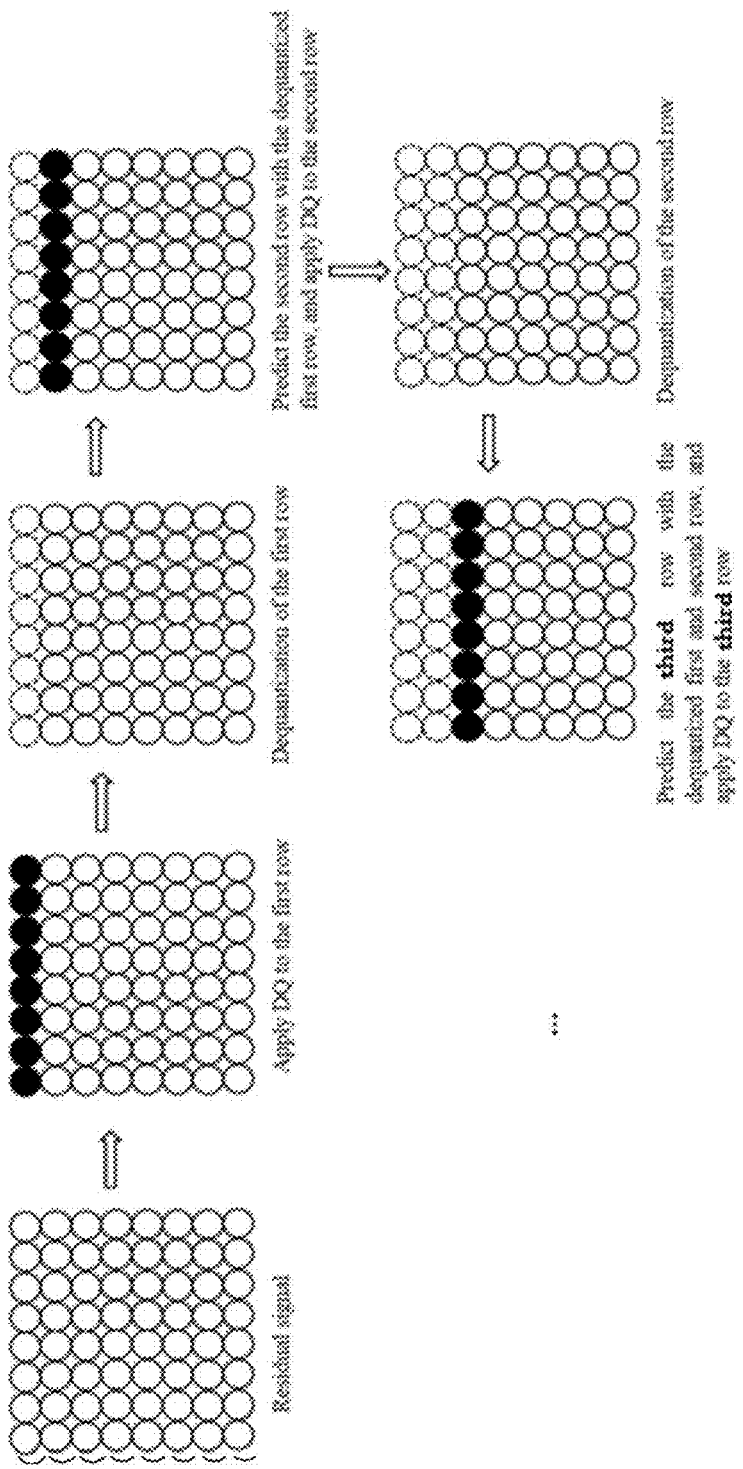
FIG. 11 is an example of apply dependent quantization to DPCM/BDPCM/RBDPCM.

2. BDPCM or/and RBDPCM may be allowed for all intra prediction modes.
   a. Alternatively, BDPCM or/and RBDPCM may be allowed only for certain intra prediction modes.
   b. In one example, residual prediction direction may be different from the intra prediction direction of the block/sub-block.
      i. Alternatively, residual prediction direction may be the same with the intra prediction direction of the block/sub-block.
      ii. In one example, only horizontal and vertical direction may be allowed for residual prediction.
      iii. In one example, 45-degree or/and 135-degree diagonal prediction directions may be also allowed for residual prediction.
      iv. In one example, when reference residual (e.g. residual used for predicting following residual) is not available at certain positions, interpolation or padding may be used to generate the reference residual values.
      1) Alternatively, zero value may be used when the reference residual is unavailable.
      2) Alternatively, a default value may be derived for the block/sub-block and used when the reference residual is unavailable.
    c. In one example, residual prediction direction may depend on the intra prediction mode.
    d. In one example, which residual prediction direction is employed by current block/sub-block may be signaled explicitly.
      i. Alternatively, which residual prediction direction is employed by current block/sub-block may be derived implicitly, e.g., depending on the dimension or/and intra prediction direction or/and allowed residual prediction directions.
        1) For example, if the intra prediction direction is closet to certain residual prediction direction, such residual prediction direction may be used.
3. DPCM or/and BDPCM or/and RBDPCM may employ dependent quantization (DQ) or trellis coded quantization (TCQ).
    a. In one example, at the encoder, after one row (or column) of the residual is quantized (e.g., may be quantized by a dependent quantizer), it may be dequantized and may be used for predicting residual of the following one or multiple rows (or columns).
    b. In one example, before encoding one row (or column), dequantized residual of some or all of previously coded rows (or columns) may be summed up and used for predicting residual of current row (column).
      i. Alternatively, furthermore, dependent quantization may be applied to the residual prediction error, e.g., difference between current residual row and its predicted residual. an example is shown in FIG. 11.
    c. In one example, the state may be reinitialized before encoding one row (or column).
      i. Alternatively, the end state of one row (or column) may be used as the start state for the next row (or column).
    d. If DQ or TCQ is used for DPCM or/and BDPCM or/and RBDPCM, when reconstructing the residual, each row (or column) may be first dequantized before used to predict other rows (or columns).
4. Whether BDPCM or/and RBDPCM is allowed or not may depend on the coding information of the current block/sub-block.
    a. In one example, BDPCM or/and RBDPCM may be disallowed in multiple reference line prediction mode.
      i. Alternatively, BDPCM or/and RBDPCM may be allowed in multiple reference line prediction mode.
      ii. Alternatively, multiple reference line prediction mode may be disallowed when BDPCM or/and RBDPCM is employed.
    b. In one example, BDPCM or/and RBDPCM may be disallowed in affine intra prediction mode.
      i. Alternatively, BDPCM or/and RBDPCM may be allowed in affine intra prediction mode.
      ii. Alternatively, affine intra prediction mode may be disallowed when BDPCM or/and RBDPCM is employed.
    c. In one example, BDPCM or/and RBDPCM may be disallowed in ISP mode.
      i. Alternatively, ISP mode may be disallowed when BDPCM or/and RBDPCM is employed.
    d. In one example, BDPCM or/and RBDPCM may be disallowed when secondary transform or/and reduced secondary transform or/and rotational transform or/and non-separable secondary transform or and/sub-block transform is employed.
      i. Alternatively, secondary transform or/and reduced secondary transform or/and rotational transform or/and non-separable secondary transform or and/sub-block transform may be disallowed when BDPCM or/and RBDPCM is employed.
    e. In one example, BDPCM or/and RBDPCM may be disallowed when default transform (e.g., DCT-II) core is not employed.
      i. Alternatively, default transform core is derived to be used when BDPCM or/and RBDPCM is employed.
    f. In one example, BDPCM or/and RBDPCM may be disallowed in CIIP mode.
      i. Alternatively, CIIP mode may be disallowed when BDPCM or/and RBDPCM is employed.
    g. Whether BDPCM or/and RBDPCM is allowed or not may depend on the coding information of neighboring (adjacent or non-adjacent) blocks.
    h. When BDPCM or RBDPCM is disallowed, the syntax elements indicating BDPCM or RBDPCM may not be signaled and inferred to be "BDPCM or RBDPCM not used".
      i. When a coding tool X (such as multiple reference line prediction mode, affine intra mode, ISP mode, secondary transform and multiple transform set (MTS) is disallowed, the syntax elements indicating coding tool X may not be signaled and inferred to be "coding tool X not used".
5. Different quantization parameters (QPs) and/or different quantization steps may be employed for different residual samples in DPCM mode or/and BDPCM mode or/and RBDPCM mode or/and transform skip mode.
    a. In one example, the quantization step for a coordinate may be adjusted according to the quantization parameter associated with the block and the coordinate.
    b. In one example, for a predefined region/coordinate, a quantization parameter different from the QP associated with the block may be used.
      i. In one example, the region may be defined as the right column or/and bottom row of a block/sub-block.
      ii. In one example, the region may be defined as the right column or/and bottom row of a CTU/CTB.
    c. In one example, the difference between the quantization parameter of the predefined region and the QP of the block may be signaled such as in SPS/VPS/PPS/slice header/tile group header/CU etc.
    d. In one example, the difference between the quantization parameter of the predefined region and the QP of the block may be derived implicitly.
      i. For example, a fixed quantization parameter difference may be used.
      ii. For example, the quantization parameter difference may depend on the slice type/picture type/CU type/QP of the block/coding information/dimension information of the block etc.

e. In one example, this method may be allowed for intra slice/tile/tile group/picture only.
f. In one example, this method may be allowed for intra mode or/and IBC mode only.
   i. Alternatively, this method may be allowed for all coding modes.
g. In one example, quantization matrices may be used for this purpose.

6. A transform may be applied on the quantized residual.
   a. In one example, a first 1-d transform (such as Hadamard transform) may be applied to each row of the quantized residual.
      i. Alternatively, the transform may be applied to several selected rows.
   b. In one example, a second 1-d transform (such as Hadamard transform) may be applied to each column of the quantized residual.
      i. Alternatively, the transform may be applied to several selected columns.
   c. In one example, a 2-d transform (such as Hadamard transform) may be applied to the quantized residual block.

7. A residual or/and quantized residual can be predicted from a function of other residuals or/and quantized residuals in a block
   a. In one example, $Q(r_{i,j})$ is predicted from $Q(r_{m,n})$, where Q(denotes quantization $r_{i,j}$ and and $r_{m,n}$ are two residuals in a block.
   b. In one example, $Q(r_{i,j})$ is predicted from rounding of $Q(r_{m,n})/2$, where Q( ) denotes quantization $r_{i,j}$ and and $r_{m,n}$ are two residuals in a block.
   c. In one example, $Q(r_{i,j})$ is predicted from rounding of $Q(r_{m,n})/t$, where Q(denotes quantization $r_{i,j}$ and and $r_{m,n}$ are two residuals in a block, t is a predefined number.

8. Residuals (e.g., due to intra/inter/IBC prediction) may be modified before quantization or/and transform etc.
   a. In one example, right column or/and bottom row of the residual of a block/sub-block may be scaled (e.g., enlarged) by a factor resiScale.
   b. In one example, right column or/and bottom row of the residual of a CTU/CTB may be scaled (e.g., enlarged) by a factor resiScale.
   c. In one example, how many rows/columns and/or which of them are scaled may be adaptively changed, such as according to block dimension/coded mode/intra prediction directions.
   d. In one example, the scaling factor resiScale may be signaled such as in SPS/VPS/PPS/slice header/tile group header/CU etc.
   e. In one example, the scaling factor resiScale may be derived implicitly.
      i. For example, a fixed scaling factor may be used.
      ii. For example, the scaling factor may depend on the slice type/picture type/CU type/QP of the block/coding information/dimension information of the block etc.
   f. resiScale may depend on the intra-prediction mode.
   g. In one example, this method may be allowed for intra slice/tile/tile group/picture only.
   h. In one example, this method may be allowed for certain coding modes (e.g., intra mode or/and IBC only).
      i. Alternatively, this method may be allowed for all coding modes.
   i. In one example, furthermore, a counterpart, i.e., rescaling process, is required after de-quantization or/and inv-transform of the residual.

9. Whether proposed methods are enabled or not may be signaled such as in VPS/SPS/PPS/slice header/tile group header/CTU/CU etc.

10. Proposed methods may be enabled/disabled according to the block dimensions.
    a. In one example, proposed methods may be enabled when W*H>=T1 && H>=T2. e.g. T1=64 and T2=8.
    b. In one example, proposed methods may be enabled H>=T1 && !(W==T2 && H==T1). E.g. T1=8 and T2=4.
    c. In one example, when a block size contains less (or not more) than M*H samples, e.g., 16 or 32 or 64 luma samples, proposed methods are not allowed.
    d. In one example, when a block size contains more (or not less) than M*H samples, e.g., 16 or 32 or 64 luma samples, proposed methods are not allowed.
    e. Alternatively, when minimum size of a block's width or/and height is smaller than or no larger than X, proposed methods are not allowed. In one example, X is set to 8.
    f. Alternatively, when a block's width>th1 or >=th1 and/or a block's height>th2 or >=th2, proposed methods are not allowed. In one example, X is set to 32.
    g. Alternatively, when a block's width<th1 or <=th1 and/or a block's height<th2 or <=th2, proposed methods are not allowed. In one example, th1 and/or th2 is set to 8.

11. Dependent quantization or trellis coded quantization may be applied in transform skip mode.
    a. In one example, for TS-coded blocks, indication of whether the value is odd or even may be signaled for a coefficient whose absolute value is greater than K (e.g., K=1).
    b. In one example, residual coding in transform skip mode may be designed to be the same as what is done for blocks coded with transform mode.

12. Residual in transform skip mode may be rotated clockwise by K-degree before encoding and may be rotated counterclockwise by K-degree after decoding.
    a. For example, K is equal to 180.
    b. In one example, residual in transform skip mode may be scanned in the same order as transform modes, e.g., sub-blocks of the TU/block are scanned from bottom-right to top-left, and coefficients within the sub-block are also scanned from bottom-right to top-left.
    c. Syntax elements of the right or/and below neighbors may be used for context modeling.
    d. This method may be applied to DPCM or/and BDPCM or/and RBDPCM mode when transform skip is implicitly or explicitly applied in such modes.

13. Transform cores used in transform modes may be flipped. The flipped transform core may be applied to a block. Alternatively, the following may be further applied:
    a. In one example, residual in transform mode may be scanned in the same order as transform skip mode, e.g., sub-blocks of the TU/block are scanned from top-left to bottom-right, and coefficients within the sub-block are also scanned from top-left to bottom-right.
    b. Syntax elements of the left or/and above neighbors may be used for context modeling.

c. In one example, secondary transform or/and reduced secondary transform or/and rotation transform may be applied to the bottom-right regions instead of the top-left region.

d. In one example, whether to use the flipped or original transform cores may be signaled/derived on-the-fly.

14. The above methods which apply to TS mode may be also applicable to other coding modes which doesn't apply transforms, such as BDPCM/QR-BDPCM.

Figure 12:
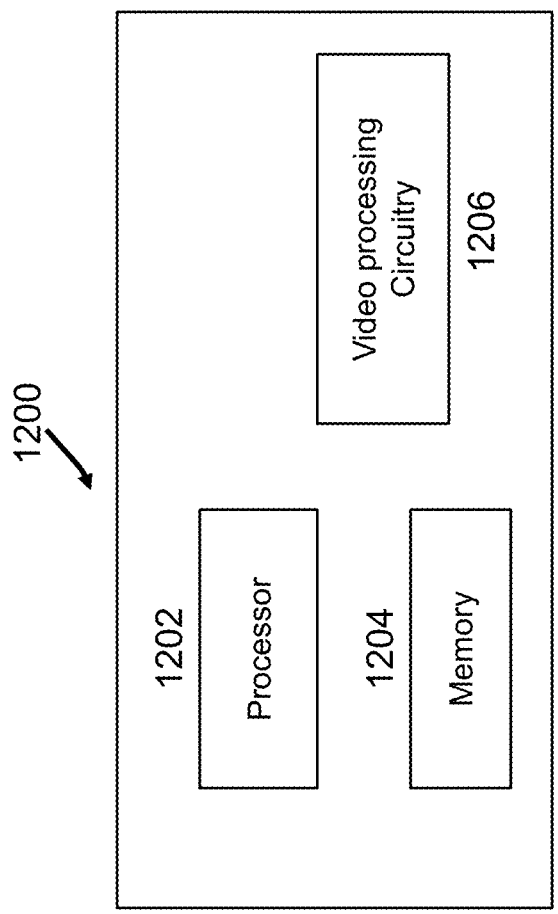
FIG. 12 is a block diagram of an example hardware platform for implementing a technique described in the present document.

FIG. 12 is a block diagram of a video processing apparatus 1200. The apparatus 1200 may be used to implement one or more of the methods described herein. The apparatus 1200 may be embodied in a smartphone, tablet, computer, Internet of Things (IoT) receiver, and so on. The apparatus 1200 may include one or more processors 1202, one or more memories 1004 and video processing hardware 1206. The processor(s) 1202 may be configured to implement one or more methods described in the present document. The memory (or memories) 1004 may be used for storing data and code used for implementing the methods and techniques described herein. The video processing hardware 1206 may be used to implement, in hardware circuitry, some techniques described in the present document.

Figure 13:
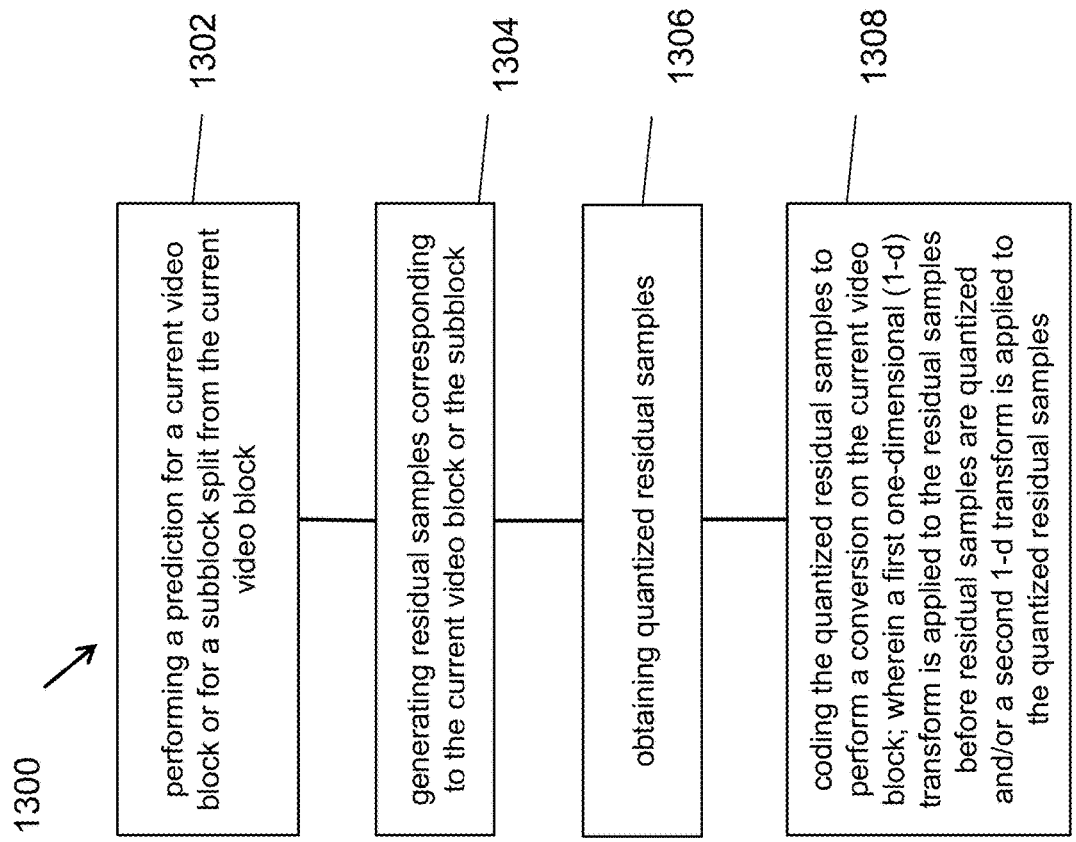
FIG. 13 is a flowchart of an example method of video processing.

FIG. 13 is a flowchart for an example method 1300 of video processing. The method 1300 includes performing (1302) a prediction for a current video block or for a subblock split from the current video block; generating (1304) residual samples corresponding to the current video block or the subblock; obtaining(1306) quantized residual samples; and coding(1308) the quantized residual samples to perform a conversion on the current video block; wherein a first one-dimensional (1-d) transform is applied to the residual samples before residual samples are quantized and/or a second 1-d transform is applied to the quantized residual samples.

Figure 14:
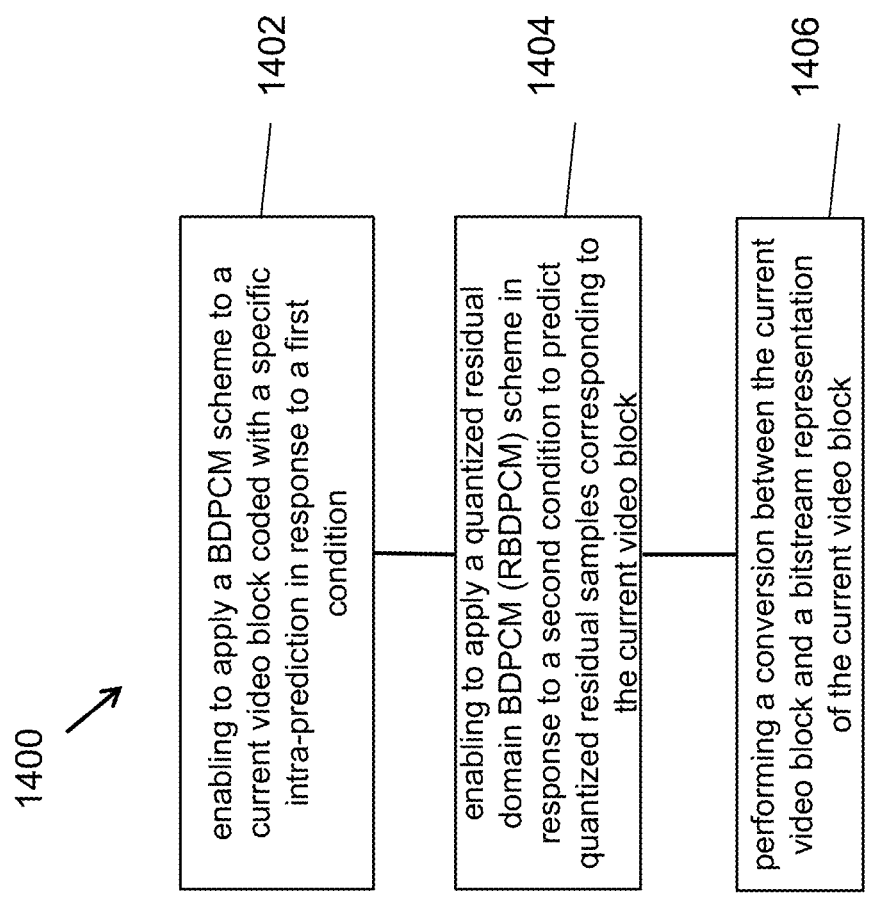
FIG. 14 is a flowchart of another example method of video processing.

FIG. 14 is a flowchart for an example method 1400 of video processing. The method 1400 includes: enabling (1402) to apply a BDPCM scheme to a current video block coded with a specific intra-prediction in response to a first condition; enabling(1404) to apply a quantized residual domain BDPCM (RBDPCM) scheme in response to a second condition to predict quantized residual samples corresponding to the current video block, and performing(1406) a conversion between the current video block and a bitstream representation of the current video block.

Figure 15:
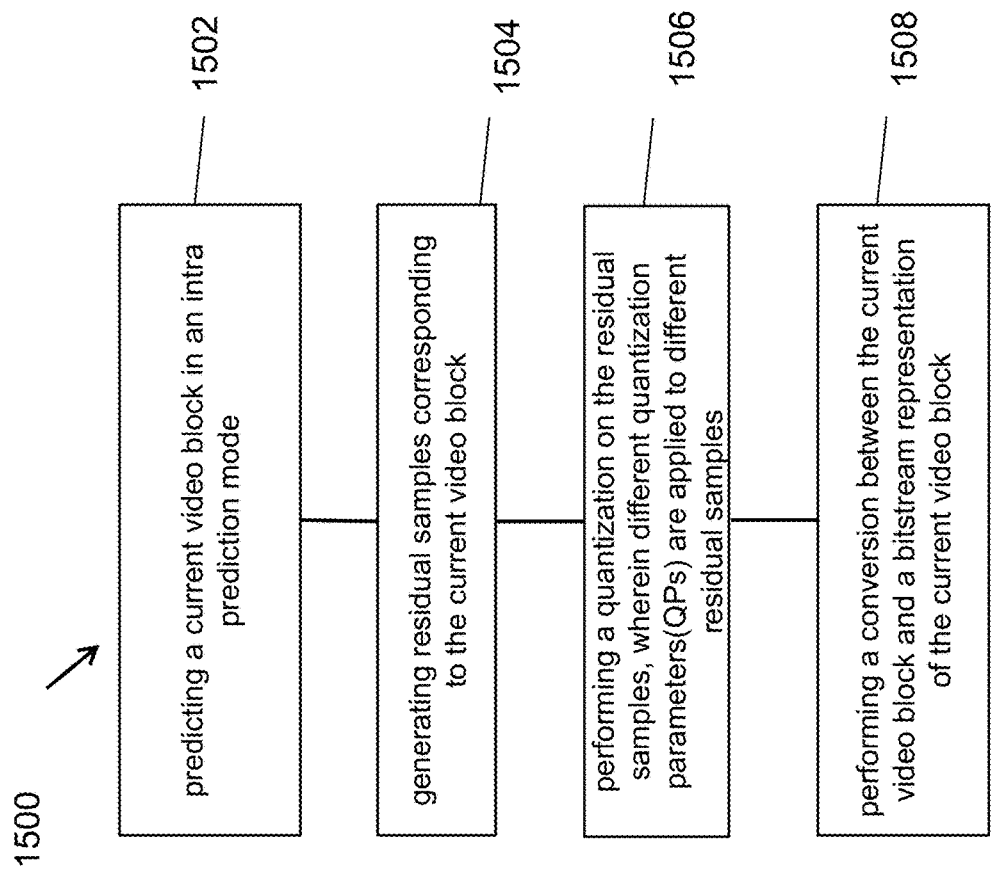
FIG. 15 is a flowchart of another example method of video processing.

FIG. 15 is a flowchart for an example method 1500 of video processing. The method 1500 includes predicting (1502) a current video block in an intra prediction mode; generating(1504) residual samples corresponding to the current video block; performing(1506) a quantization on the residual samples, wherein different quantization parameters (QPs) are applied to different residual samples; and performing(1508) a conversion between the current video block and a bitstream representation of the current video block.

Figure 16:
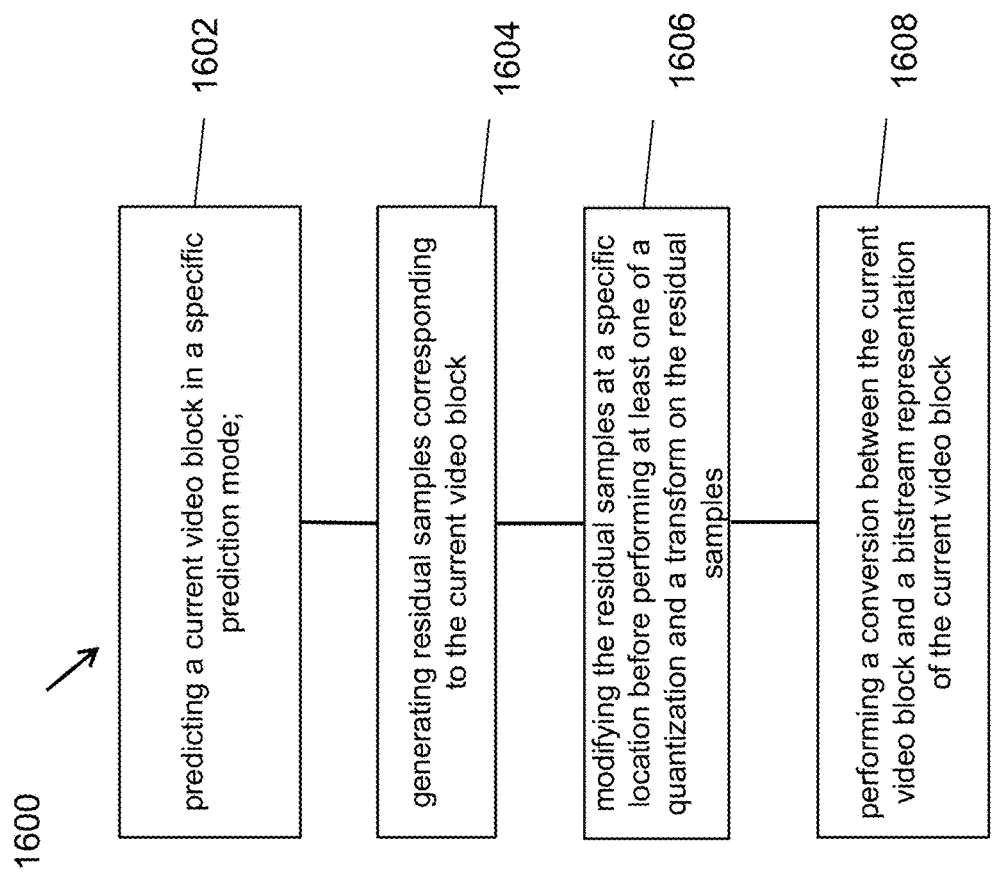
FIG. 16 is a flowchart of another example method of video processing.

FIG. 16 is a flowchart for an example method 1600 of video processing. The method 1600 includes predicting (1602) a current video block in a specific prediction mode; generating(1604) residual samples corresponding to the current video block; modifying(1606) the residual samples at a specific location before performing at least one of a quantization and a transform on the residual samples; and performing(1608) a conversion between the current video block and a bitstream representation of the current video block.

Figure 17:
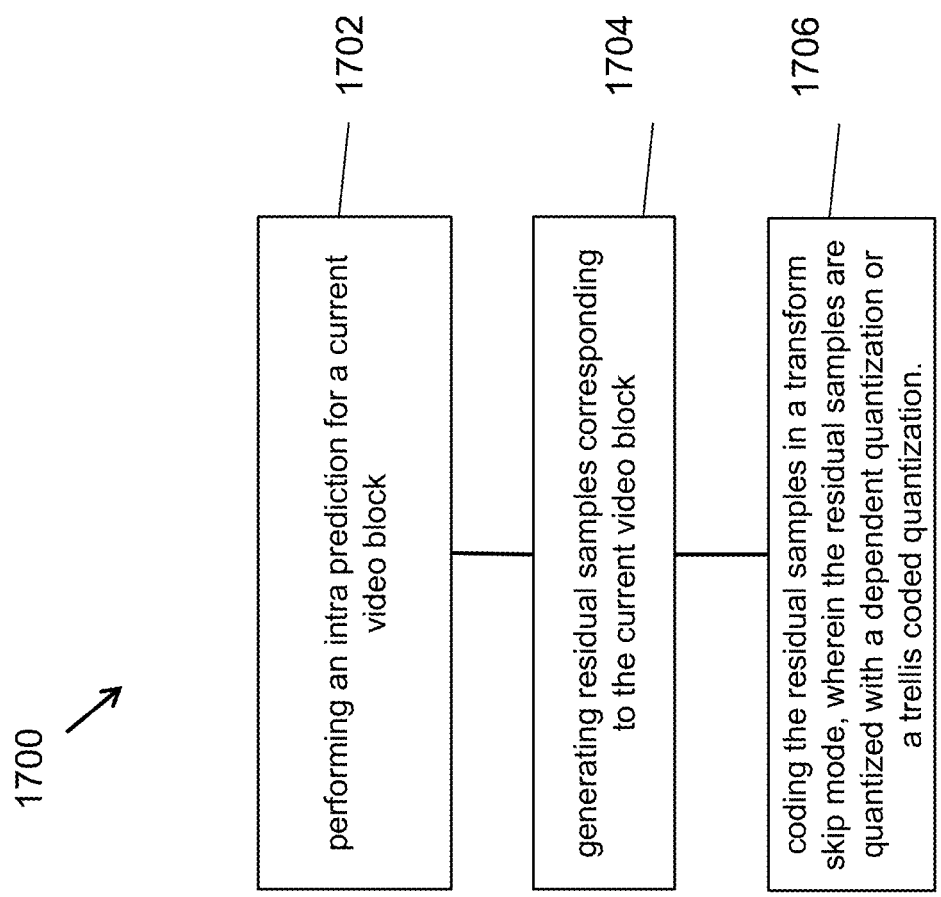
FIG. 17 is a flowchart of another example method of video processing.

FIG. 17 is a flowchart for an example method 1700 of video processing. The method 1700 includes performing (1702) an intra prediction for a current video block; generating(1704) residual samples corresponding to the current video block; and coding(1706) the residual samples in a transform skip mode, wherein the residual samples are quantized with a dependent quantization or a trellis coded quantization.

Figure 18:
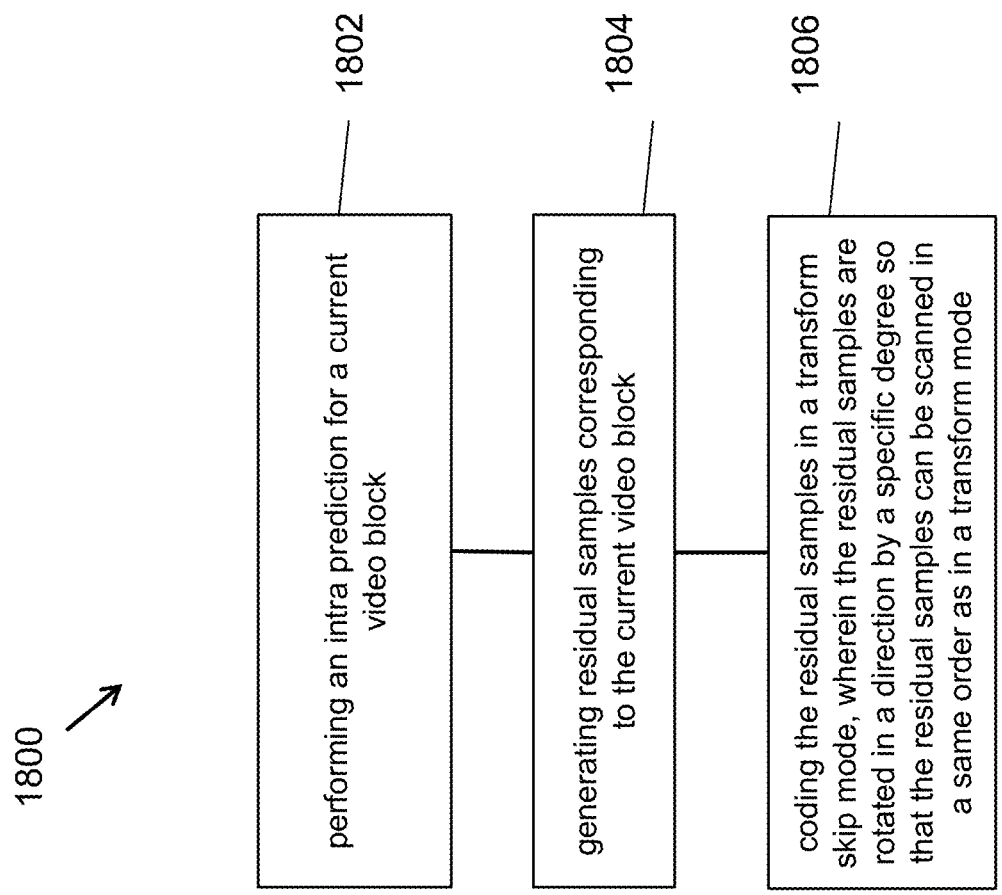
FIG. 18 is a flowchart of another example method of video processing.

FIG. 18 is a flowchart for an example method 1800 of video processing. The method 1800 includes performing (1802) an intra prediction for a current video block; generating(1804) residual samples corresponding to the current video block; and coding(1806) the residual samples in a transform skip mode, wherein the residual samples are rotated in a direction by a specific degree so that the residual samples can be scanned in a same order as in a transform mode.

Figure 19:
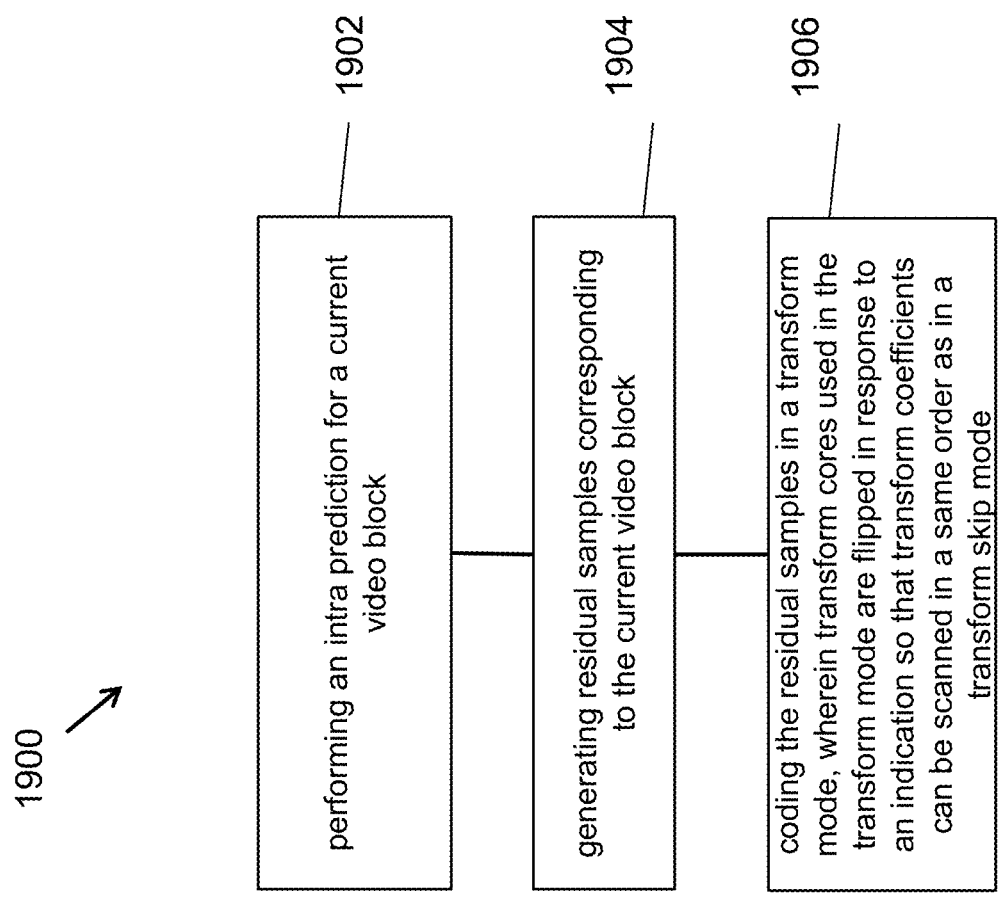
FIG. 19 is a flowchart of another example method of video processing.

FIG. 19 is a flowchart for an example method 1900 of video processing. The method 1900 includes performing (1902) an intra prediction for a current video block; generating(1904) residual samples corresponding to the current video block; and coding(1906) the residual samples in a transform mode, wherein transform cores used in the transform mode are flipped in response to an indication so that transform coefficients can be scanned in a same order as in a transform skip mode.

Additional embodiments and techniques can as described in the following examples.

In an example, a method for video processing comprises: performing a prediction for a current video block or for a subblock split from the current video block; generating residual samples corresponding to the current video block or the subblock; obtaining quantized residual samples; and coding the quantized residual samples to perform a conversion on the current video block; wherein a first one-dimensional (1-d) transform is applied to the residual samples before residual samples are quantized and/or a second 1-d transform is applied to the quantized residual samples.

In an example, the current video block or the subblock is predicted with a block differential pulse-code modulation (BDPCM) scheme.

In an example, the method further comprises applying a quantized residual domain BDPCM(RBDPCM) scheme to predict the quantized residual samples.

In an example, the first 1-d transform is applied to the residual samples in a first direction to generate transform coefficients.

In an example, the first direction depends on a direction in which the residual samples are coded.

In an example, the first 1-d transform is applied to each row of the residual samples if the residual samples are coded on a row-by-row basis.

In an example, the first 1-d transform is applied to each column of the residual samples if the residual samples are coded on a column-by-column basis.

In an example, the first direction depends on a direction in which the residual samples are predicted.

In an example, the first 1-d transform is applied to each row of the residual samples if the residual samples are predicted in a vertical direction.

In an example, the first 1-d transform is applied to each column of the residual samples if the residual samples are predicted in a horizontal direction.

In an example, the first 1-d transform is only applied to a part of rows or columns of the residual samples.

In an example, specific rows or columns of the residual samples are forced to be zero before the first 1-d transform is applied.

In an example, specific transform coefficients are forced to be zero after the first 1-d transform is applied.

In an example, the second 1-d transform is applied to the quantized residual samples in a second direction after the residual samples are predicted in the RBDPCM scheme.

In an example, the second direction depends on a direction in which the residual samples are predicted in the RBDPCM scheme.

In an example, the second 1-d transform is applied to each column of the residual samples if the residual samples are predicted in a vertical direction.

In an example, the second 1-d transform is applied to each row of the residual samples if the residual samples are predicted in a horizontal direction.

In an example, the second 1-d transform is only applied to a part of rows or columns of the residual samples.

In an example, the second 1-d transform is applied to at least one subset of residual samples, wherein the at least one subset of residual samples comprises more than one line of residual samples in a specific direction.

In an example, the more than one line of residual samples in the specific direction comprises more than one row of residual samples or more than one column of residual samples.

In an example, the at least one subset of residual samples comprises a first subset of residual samples and a second subset of residual samples, and transform coefficients of the second subset of residual samples are predicted from transform coefficients or quantized transform coefficients of the first subset of residual samples.

In an example, the second 1-d transform comprises a Hadamard transform.

In an example, an average value of the transform coefficients of the second subset are predicted from an average value of the transform coefficients of the first subset.

In an example, the method further comprises: applying a first quantization to transform coefficients generated by the second 1-d transform.

In an example, differences between transform coefficients to be coded and previous transform coefficients are calculated and quantized in the first quantization if the transform coefficients to be coded are predicted from the previous transform coefficients.

In an example, transform coefficients that are not used for predicting other transform coefficients are quantized in the first quantization.

In an example, the method further comprises: applying a second quantization is applied to the residual samples before the second 1-d transform is performed.

In an example, only one of the first 1-d transform and the second 1-d transform is allowed to be performed.

In an example, at least one of the first 1-d transform and the second 1-d transform comprises at least one of allowed transforms in a multiple transform set (MTS) mode.

In an example, the allowed transforms comprise discrete cosine transform (DCT)-II and discrete sine transform (DST)-VII, and DCT-VIII.

In an example, at least one of the first 1-d transform and the second 1-d transform comprises at least one of allowed transforms in a Reduced Secondary Transform (RST) mode.

In an example, the allowed transform comprises a non-separable transform.

In an example, a transform core utilized in at least one of the first 1-d transform and the second 1-d transform is signaled explicitly or derived implicitly.

In an example, the transform core is signaled in at least one of a sequence parameter set (SPS), a video parameter set (VPS), a picture parameter set (PPS), a slice header, a tile group header, a tile, a coding tree unit(CTU), and a coding unit (CU) level.

In an example, the transform core is fixed or adapted to a characteristic of the current video block.

In an example, the characteristic of the current video block comprises at least one of a type of a slice, a picture or a CU covering the current video block, a quantization parameter (QP), coding information, and dimension information of the current video block, and the intra-prediction mode.

In an example, a residual prediction direction of the residual samples is different from an intra prediction direction of the current video block.

In an example, a residual prediction direction of the residual samples is same as an intra prediction direction of the current video block.

In an example, the residual prediction direction comprises a horizontal direction and a vertical direction.

In an example, the residual prediction direction further comprises at least one of a 45-degree diagonal direction and a 135-degree diagonal direction.

In an example, the residual prediction direction depends on the intra prediction mode.

In an example, the residual prediction direction is signaled explicitly or derived implicitly.

In an example, the residual prediction direction is adapted to at least one of a dimension, an intra prediction direction and allowed residual prediction directions of the current video block.

In an example, the residual prediction direction is closest to the intra prediction direction of the current video block.

In an example, if reference residual samples are not available for predicting subsequent residual samples in the residual prediction direction, an interpolation is used or default values are padded to generate the reference residual samples.

In an example, the default value are zero.

In an example, the default values are derived for the current video block.

In an example, a method for video processing, comprises: enabling to apply a BDPCM scheme to a current video block coded with a specific intra-prediction in response to a first condition; enabling to apply a quantized residual domain BDPCM (RBDPCM) scheme in response to a second condition to predict quantized residual samples corresponding to the current video block, and performing a conversion between the current video block and a bitstream representation of the current video block.

In an example, a specific intra prediction comprises all or partial of intra prediction modes allowed for the current video block.

In an example, the residual samples are quantized with a dependent quantization (DQ) or trellis coded quantization (TCQ).

In an example, after a subset of residual samples is quantized, the quantized subset of residual samples is dequantized and is used to predict a subsequent subset of residual samples.

In an example, the subset of residual samples comprises at least one row or column of residual samples, and the subsequent subset of residual samples comprises one or more subsequent rows or columns of residual samples.

In an example, the dequantized at least one row or column of residual samples are summed up and used for predicting the one or more subsequent rows or columns of residual samples.

In an example, after quantizing the subset of residual samples, an ending state of DQ or TCQ can be used as a starting state for quantizing the subsequent subset of residual samples.

In an example, the first and second conditions comprises one of a coding mode to be applied to the current video block, type of transform to be applied to the residual samples, default transform core utilized in the transform, coding information of the current video block, coding information of neighboring blocks.

In an example, the BDPCM scheme and/or RBDPCM scheme is disabled if the coding mode belongs to one of a multiple reference line prediction mode, an affine intra prediction mode, an intra subblock partitioning (ISP) mode and a combined intra-inter prediction(CIIP) mode.

In an example, the BDPCM scheme and/or RBDPCM scheme is disabled if the type of transform belongs to one of a secondary transform, a reduced secondary transform a rotational transform, a non-separable secondary transform, and a sub-block based transform.

In an example, the BDPCM scheme and/or RBDPCM scheme is disabled if the default transform core is not utilized.

In an example, the default transform core comprises DCI-II.

In an example, if the BDPCM scheme and/or RBDPCM scheme is disabled, a syntax element indicating BDPCM and/or RBDPCM is not signaled.

In an example, if the BDPCM scheme and/or RBDPCM scheme is enabled, a syntax element which indicates the coding mode which is incompatible with the BDPCM scheme and/or RBDPCM scheme is not signaled.

In an example, a method for video processing, comprises: predicting a current video block in an intra prediction mode; generating residual samples corresponding to the current video block; performing a quantization on the residual samples, wherein different quantization parameters(QPs) are applied to different residual samples; and performing a conversion between the current video block and a bitstream representation of the current video block.

In an example, quantization steps are different for different residual samples.

In an example, a quantization step is adjusted based on a QP associated with the current video block and a coordinate of the residual sample.

In an example, the QP applied to a specific region in the current video block is different from the QP associated with the current video block.

In an example, the specific region belongs to at least one of a right column and a bottom row of the current video block.

In an example, the specific region belongs to at least one of a right column and a bottom row of a coding tree unit(CTU) or a coding tree block(CTB) covering the current video block.

In an example, a difference between QP applied to the specific region and QP associated with the current video block is signaled in at least one of a sequence parameter set (SPS), a video parameter set (VPS), a picture parameter set (PPS), a slice header, a tile group header, and a coding unit (CU) level.

In an example, a difference between QP applied to the specific region and QP associated with the current video block is fixed or adapted to a characteristic of the current video block.

In an example, the characteristic of the current video block comprises at least one of a type of a slice, a picture or a CU covering the current video block, a quantization parameter (QP), coding information, and dimension information of the current video block.

In an example, the different QPs are arranged in quantization matrices.

In an example, at least one transform is applied to the quantized residual samples.

In an example, the at least one transform comprises a first 1-d transform, and the first 1-d transform is applied to a subset of the quantized residual samples.

In an example, the subset of the quantized residual samples comprises each row of the quantized residual samples.

In an example, the subset of the quantized residual samples comprises a plurality of selected rows of the quantized residual samples.

In an example, the at least one transform comprises a second 1-d transform, and the second 1-d transform is applied to a subset of the quantized residual samples.

In an example, the subset of the quantized residual samples comprises each column of the quantized residual samples.

In an example, the subset of the quantized residual samples comprises a plurality of selected columns of the quantized residual samples.

In an example, the at least one transform comprises a 2-d transform, and the 2-d transform is applied to all the quantized residual samples.

In an example, a residual sample is predicted from a function of at least one other residual samples of the current video block.

In an example, a quantized residual sample $Q(r_{i,j})$ is predicted from a function of at least one previously quantized residual samples $Q(r_{m,n})$ of the current video block, wherein Q( ) denotes quantization, $r_{i,j}$ and and $r_{m,n}$ represents two residual samples.

In an example, the function is a rounding of $Q(r_{m,n})/t$, t representing a predefined number.

In an example, t=2.

In an example, a method for video processing, comprises: predicting a current video block in a specific prediction mode; generating residual samples corresponding to the current video block; modifying the residual samples at a specific location before performing at least one of a quantization and a transform on the residual samples; and performing a conversion between the current video block and a bitstream representation of the current video block.

In an example, the residual samples at the specific location are scaled by a scaling factor.

In an example, the specific location comprises a right column or a bottom row of the residual samples of the current video block.

In an example, the specific location comprises a right column or a bottom row of the residual samples of a CTU or CTB covering the current video block.

In an example, the specific location is adapted to at least one of a block dimension, a coding mode, and an intra prediction direction of the current video block.

In an example, the scaling factor is signaled in at least one of a sequence parameter set (SPS), a video parameter set (VPS), a picture parameter set (PPS), a slice header, a tile group header, and a coding unit (CU) level.

In an example, the scaling factor is fixed or adapted to a characteristic of the current video block.

In an example, the characteristic of the current video block comprises at least one of a type of a slice, a type of a picture or a type of a CU covering the current video block, a quantization parameter (QP), coding information, and dimension information of the current video block, and the intra-prediction mode.

In an example, the method is allowed for a specific intra video region.

In an example, the specific intra video region comprises one of an intra slice, a tile, a tile group and a picture.

In an example, the method is allowed for a specific coding mode.

In an example, the specific coding mode comprises one of an intra mode and an intra block copy(IBC) mode.

In an example, whether the method is enabled depends on an indication signaled in at least one of a sequence parameter set (SPS), a video parameter set (VPS), a picture parameter set (PPS), a slice header, a tile group header, a CTU and a CU level.

In an example, whether the method is enabled depends on a block dimension of the current video block.

In an example, the method is enabled if the block dimension of the current video block satisfies: W*H>=T1 && H>=T2.

In an example, T1=64 and T2=8.

In an example, the method is enabled if the block dimension of the current video block satisfies: H>=T1 && !(W==T2 && H==T1).

In an example, T1=8, T2=4.

In an example, the method is disabled if the block dimension of the current video block satisfies at least one of the following:
  an amount of samples contained in the current video block is less than a first threshold;
  a minimum size of a height and width of the current video block is not more than a second threshold;
  the height of the current video block is not more than a third threshold; and
  the width of the current video block is not more than a fourth threshold.

In an example, the first threshold is equal to one of 16, 32 and 64.

In an example, the second threshold is equal to 8.

In an example, at least one of the third and fourth thresholds is equal to 8.

In an example, the method is disabled if the block dimension of the current video block satisfies at least one of the following:
  an amount of samples contained in the current video block is more than a fifth threshold;
  a height of the current video block is not less than a sixth threshold; and
  a width of the current video block is not less than a seventh threshold.

In an example, the fifth threshold is equal to one of 16, 32 and 64.

In an example, at least one of the sixth and seventh thresholds is equal to 32.

In an example, a method for processing video, comprises: performing an intra prediction for a current video block; generating residual samples corresponding to the current video block; and coding the residual samples in a transform skip mode, wherein the residual samples are quantized with a dependent quantization or a trellis coded quantization.

In an example, for a coefficient whose absolute value is greater than K, an indication is signaled for indicating that the absolute value is odd or even.

In an example, K=1.

In an example, the residual samples are coded in the transform skip mode in a same way as in a transform mode.

In an example, a method for processing video, comprises: performing an intra prediction for a current video block; generating residual samples corresponding to the current video block; and coding the residual samples in a transform skip mode, wherein the residual samples are rotated in a direction by a specific degree so that the residual samples can be scanned in a same order as in a transform mode.

In an example, the rotated residual samples are rotated in an opposite direction by the specific degree during a decoding process.

In an example, the direction is a clockwise direction, and the specific degree is equal to 180 degree.

In an example, the current video block is split into a plurality of subblocks, the plurality of subblocks are scanned from bottom-right to top-left, and the residual samples in each of the plurality of subblocks are scanned from bottom-right to top-left.

In an example, syntax elements associated with specific residual samples are used for context modeling.

In an example, the specific residual samples comprises right and/or below neighboring residual samples.

In an example, a method for processing video, comprises: performing an intra prediction for a current video block; generating residual samples corresponding to the current video block; and coding the residual samples in a transform mode, wherein transform cores used in the transform mode are flipped in response to an indication so that transform coefficients can be scanned in a same order as in a transform skip mode.

In an example, the current video block is split into a plurality of subblocks, the plurality of subblocks are scanned from top-left to bottom-right, and the transform coefficients in each of the plurality of subblocks are scanned from top-left to bottom-right.

In an example, syntax elements associated with specific residual samples are used for context modeling.

In an example, the specific residual samples comprises left and/or above neighboring residual samples.

In an example, a secondary transform is applied to a bottom-right region instead of a top-left region of the residual samples.

In an example, the secondary transform comprises a reduced secondary transform and/or a rotation transform.

In an example, the indication is explicitly signaled or derived on-the-fly.

In an example, the conversion includes encoding the current video block into the bitstream representation of a video and decoding the current video block from the bitstream representation of the video.

In an example, an apparatus in a video system comprises a processor and a non-transitory memory with instructions thereon, wherein the instructions upon execution by the processor, cause the processor to implement the methods as described above.

In an example, a non-transitory computer readable media is disclosed, which has program code stored thereupon, the program code, when executed, causing a processor to implement the methods as described above.

It will be appreciated that the disclosed techniques may be embodied in video encoders or decoders to improve compression efficiency using one or more of a first 1-d transform, a zeroing-out strategy during coding of residuals due to intra-block prediction, and a second 1-d transform during coding and a corresponding inverse operation during decoding.

The disclosed and other solutions, examples, embodiments, modules and the functional operations described in this document can be implemented in digital electronic circuitry, or in computer software, firmware, or hardware, including the structures disclosed in this document and their structural equivalents, or in combinations of one or more of them. The disclosed and other embodiments can be implemented as one or more computer program products, i.e., one or more modules of computer program instructions encoded on a computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more them. The term "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them. A propagated signal is an artificially generated signal, e.g., a machine-generated electrical, optical, or electromagnetic signal, that is generated to encode information for transmission to suitable receiver apparatus.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this document can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random-access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory can be supplemented by, or incorporated in, special purpose logic circuitry.

While this patent document contains many specifics, these should not be construed as limitations on the scope of any subject matter or of what may be claimed, but rather as descriptions of features that may be specific to particular embodiments of particular techniques. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

The invention claimed is:

1. A method of processing video data, comprising:
   performing, for a conversion between visual media data of a video and a bitstream of the video, a prediction for a current video block of the visual media data;
   generating residual samples corresponding to the current video block or a subblock split from the current video block;
   quantizing the residual samples to generate quantized residual samples; and
   coding the quantized residual samples to perform the conversion,
   wherein a first one-dimensional (1-d) transform is applied to the residual samples before the quantizing and/or a second 1-d transform is applied to the quantized residual samples, and
   wherein the current video block or the subblock is coded with a block differential pulse-code modulation (BDPCM) scheme and/or a quantized residual domain BDPCM (RBDPCM) scheme.

2. The method of claim 1, wherein the current video block or the subblock is coded with the RBDPCM scheme.

3. The method of claim 1, wherein the prediction is performed at least based on one or more intra prediction modes.

4. The method of claim 1, wherein the first 1-d transform is applied to the residual samples in a first direction to generate transform coefficients, and the first direction depends on a direction in which the residual samples are coded.

5. The method of claim 4, wherein the first 1-d transform is applied to each row of the residual samples in response to the residual samples being coded on a row-by-row basis, and the first 1-d transform is applied to each column of the residual samples in response to the residual samples being coded on a column-by-column basis.

6. The method of claim 5, wherein the first direction depends on a direction in which the residual samples are predicted, the first 1-d transform is applied to each row of the residual samples in response to the residual samples being predicted in a vertical direction, and the first 1-d transform is applied to each column of the residual samples in response to the residual samples being predicted in a horizontal direction.

7. The method of claim 2, wherein the second 1-d transform is applied to the quantized residual samples in a second direction after the residual samples are predicted in the RBDPCM scheme, and the second direction depends on a direction in which the residual samples are predicted in the RBDPCM scheme,
wherein the second 1-d transform is applied to each column of the residual samples in response to the residual samples being predicted in a vertical direction, and the second 1-d transform is applied to each row of the residual samples in response to the residual samples being predicted in a horizontal direction.

8. The method of claim 1, wherein the second 1-d transform is applied to at least one subset of residual samples, wherein the at least one subset of residual samples comprises more than one line of residual samples in a specific direction.

9. The method of claim 8, wherein the more than one line of residual samples in the specific direction comprises more than one row of residual samples or more than one column of residual samples, and
wherein the at least one subset of residual samples comprises a first subset of residual samples and a second subset of residual samples, and transform coefficients of the second subset of residual samples are predicted from transform coefficients or quantized transform coefficients of the first subset of residual samples.

10. The method of claim 1, further comprising:
applying a first quantization to transform coefficients generated by the second 1-d transform and applying a second quantization to the residual samples before the second 1-d transform is performed.

11. The method of claim 1, wherein differences between transform coefficients to be coded and previous transform coefficients are calculated and quantized in a first quantization when the transform coefficients to be coded are predicted from the previous transform coefficients.

12. The method of claim 3, wherein a residual prediction direction of the residual samples is different from an intra prediction direction of the current video block or a residual prediction direction of the residual samples is same as an intra prediction direction of the current video block.

13. The method of claim 12, wherein the residual prediction direction comprises at least one of a horizontal direction, a vertical direction, a 45-degree diagonal direction and a 135-degree diagonal direction.

14. The method of claim 1, wherein the residual samples are quantized with a dependent quantization (DQ) or trellis coded quantization (TCQ).

15. The method of claim 1, wherein the residual samples are quantized with different quantization parameters (QPs) and/or different quantization steps, and a QP applied to a specific region in the current video block is different from a QP associated with the current video block.

16. The method of claim 1, wherein the method further comprising:
modifying the residual samples at a specific location before performing at least one of a quantization and a transform on the residual samples.

17. The method of claim 1, wherein the residual samples are coded in a transform mode, wherein transform cores used in the transform mode are flipped in response to an indication so that transform coefficients can be scanned in a same order as in a transform skip mode.

18. An apparatus for processing video data comprising a processor and a non-transitory memory with instructions thereon, wherein the instructions upon execution by the processor, cause the processor to:
perform, for a conversion between visual media data of a video and a bitstream of the video, a prediction for a current video block of the visual media data;
generate residual samples corresponding to the current video block or a subblock split from the current video block;
quantize the residual samples to generate quantized residual samples; and
code the quantized residual samples to perform the conversion,
wherein a first one-dimensional (1-d) transform is applied to the residual samples before the quantizing and/or a second 1-d transform is applied to the quantized residual samples, and
wherein the current video block or the subblock is coded with a block differential pulse-code modulation (BDPCM) scheme and/or a quantized residual domain BDPCM (RBDPCM) scheme.

19. The apparatus of claim 18, wherein the current video block or the subblock is coded with the RBDPCM scheme.

20. A non-transitory computer-readable recording medium storing a bitstream of a video which is generated by a method performed by a video processing apparatus, wherein the method comprises:
performing a prediction for a current video block of visual media data of the video;
generating residual samples corresponding to the current video block or a subblock split from the current video block;
quantizing the residual samples to generate quantized residual samples; and
generating the bitstream based on the quantized residual samples,
wherein a first one-dimensional (1-d) transform is applied to the residual samples before the quantizing and/or a second 1-d transform is applied to the quantized residual samples, and
wherein the current video block or the subblock is coded with a block differential pulse-code modulation (BDPCM) scheme and/or a quantized residual domain BDPCM (RBDPCM) scheme.

* * * * *